(12) United States Patent
Grover

(10) Patent No.: US 7,796,152 B2
(45) Date of Patent: Sep. 14, 2010

(54) MULTI-DIMENSIONAL IMAGING

(75) Inventor: Trent Grover, Ames, IA (US)

(73) Assignee: Micoy Corporation, Ames, IA (US)

( * ) Notice: Subject to any disclaimer, the term of this patent is extended or adjusted under 35 U.S.C. 154(b) by 1351 days.

(21) Appl. No.: 11/098,221

(22) Filed: Apr. 4, 2005

(65) Prior Publication Data

US 2006/0227417 A1 Oct. 12, 2006

(51) Int. Cl.
*H04N 13/00* (2006.01)
(52) U.S. Cl. .......................................... 348/42; 359/462
(58) Field of Classification Search .................... 348/42, 348/43; 359/462
See application file for complete search history.

(56) References Cited

U.S. PATENT DOCUMENTS

| | | | |
|---|---|---|---|
| 3,187,339 | A | 6/1965 | Clay |
| 3,357,770 | A | 12/1967 | Clay |
| 4,214,821 | A | 7/1980 | Termes |
| 4,525,038 | A | 6/1985 | Muller |
| 4,868,682 | A | 9/1989 | Shimizu et al. |
| 5,023,725 | A | 6/1991 | McCutchen |
| 5,130,794 | A | 7/1992 | Ritchey |
| 5,657,073 | A | 8/1997 | Henley |
| 6,002,430 | A | 12/1999 | McCall et al. |
| 6,522,325 | B1 | 2/2003 | Sorokin et al. |
| 6,665,003 | B1 | 12/2003 | Peleg et al. |
| 6,795,109 | B2 | 9/2004 | Peleg et al. |
| 6,831,677 | B2 | 12/2004 | Peleg et al. |
| 6,947,059 | B2 | 9/2005 | Pierce et al. |
| 7,015,954 | B1 | 3/2006 | Foote et al. |

FOREIGN PATENT DOCUMENTS

| | | |
|---|---|---|
| DE | 10030196 A1 | 1/2002 |
| JP | 07-140569 | 6/1995 |
| WO | WO 9621197 A1 | 7/1996 |
| WO | WO 2005067318 | 7/2005 |

OTHER PUBLICATIONS

Peleg et al., "Stereo Panorama with a Single Camera", "Proc. IEEE Computer Vision and Pattern Recognition (CVPR)", Jun. 1999, pp. 395-401.
Peleg et al., "Panoramic Imaging with Horizontal Stereo", "in Panoramic Vision: Sensors, Theory, Applications", 2001, pp. 143-160.

(Continued)

*Primary Examiner*—Y. Lee
*Assistant Examiner*—Richard Torrente
(74) *Attorney, Agent, or Firm*—Charles A. Lemaire; Lemaire Patent Law Firm, P.L.L.C.

(57) ABSTRACT

An apparatus and a system, as well as a method and an article, may include receiving a plurality of left eye rays through a first plurality of separating facets of a lens at an image acquisition plane, and receiving a plurality of right eye rays through a second plurality of separating facets of the lens at the image acquisition plane. Data acquired from the image plane may be used to construct a stereoscopic image, including a moving, panoramic stereoscopic image. Lenses, image capture devices, and projectors may be implemented that operate using multiple viewpoints.

55 Claims, 29 Drawing Sheets

OTHER PUBLICATIONS

Peleg et al., "Omnistereo: Panoramic Stereo Imaging.", "IEEE Transactions on Pattern Analysis and Machine Intelligence.", Mar. 2001, pp. 279-290, vol. 23, No. 3.

Peleg et al., "Cameras for Stereo Panoramic Imaging", "Proc. IEEE Computer Vision and Pattern Recognition (CVPR)", Jun. 2000, pp. 208-214.

Pritch et al, "Optics for OmniStereo Imaging", "Foundations of Image Understanding, Kluwer Academic", 2001, pp. 447-467.

Pritch, Y., etal, "Automatic Disparity Control in Stereo Panoramas (OmniStereo)", "Omnidirectional Vision, Proceedings.", Jun. 12, 2000, p. 8.

Zhigang Zhu, "Omnidirectional Stereo Vision", "Omnidirectional Vision, 10th IEEE ICAR, Budapest, Hungary", Aug. 2001.

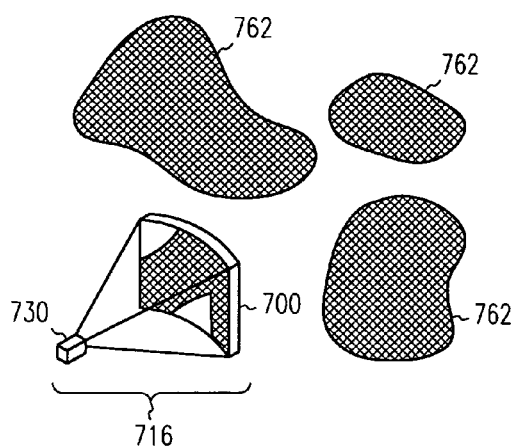
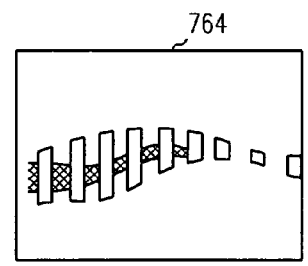
FIG. 7A  FIG. 7B
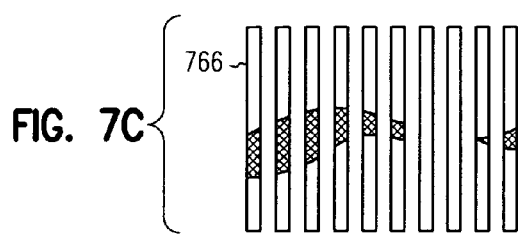
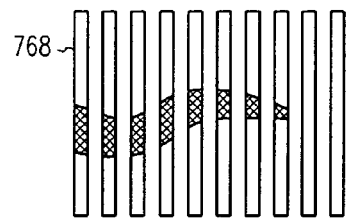
FIG. 7C
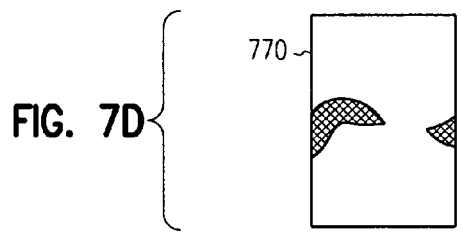
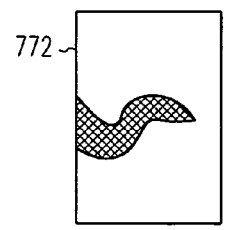
FIG. 7D
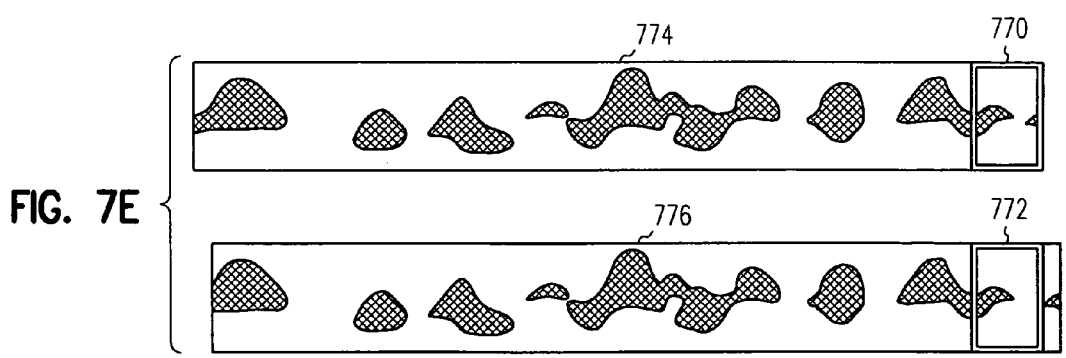
FIG. 7E

L = LEFT EYE    R = RIGHT EYE

MULTI-DIMENSIONAL IMAGING

TECHNICAL FIELD

Various embodiments described herein relate generally to image processing, including apparatus, systems, and methods used to record and project multi-dimensional images.

BACKGROUND INFORMATION

Cylindrical panoramas may be constructed using a single rotating camera. As the camera is rotated, images may be captured at defined increments until the desired panoramic field of view has been traversed. Vertical strips may then be extracted from the center of each image, and the strips can be placed next to one another to form a single uninterrupted cylindrical panoramic image.

This process can be extended to create cylindrical stereoscopic (e.g., three-dimensional) panoramic images. For example, two cameras can be mounted, one next to the other, separated by a defined distance. The cameras may then be rotated in unison about a point halfway between them. Each camera can be used to create a separate cylindrical panorama using concatenated vertical image slices, as described above. When the two resulting panoramas are viewed together, one by an observer's left eye and the other by the observer's right eye, a stereoscopic effect is achieved. However, while the rotating two-camera model may be useful for creating still stereoscopic images, the system described does not lend itself to efficiently providing a moving stereoscopic panoramic image.

BRIEF DESCRIPTION OF THE DRAWINGS

FIGS. 7A-7E illustrate portions of a stereoscopic panorama creation process according to various embodiments;

DETAILED DESCRIPTION

Figure 1:
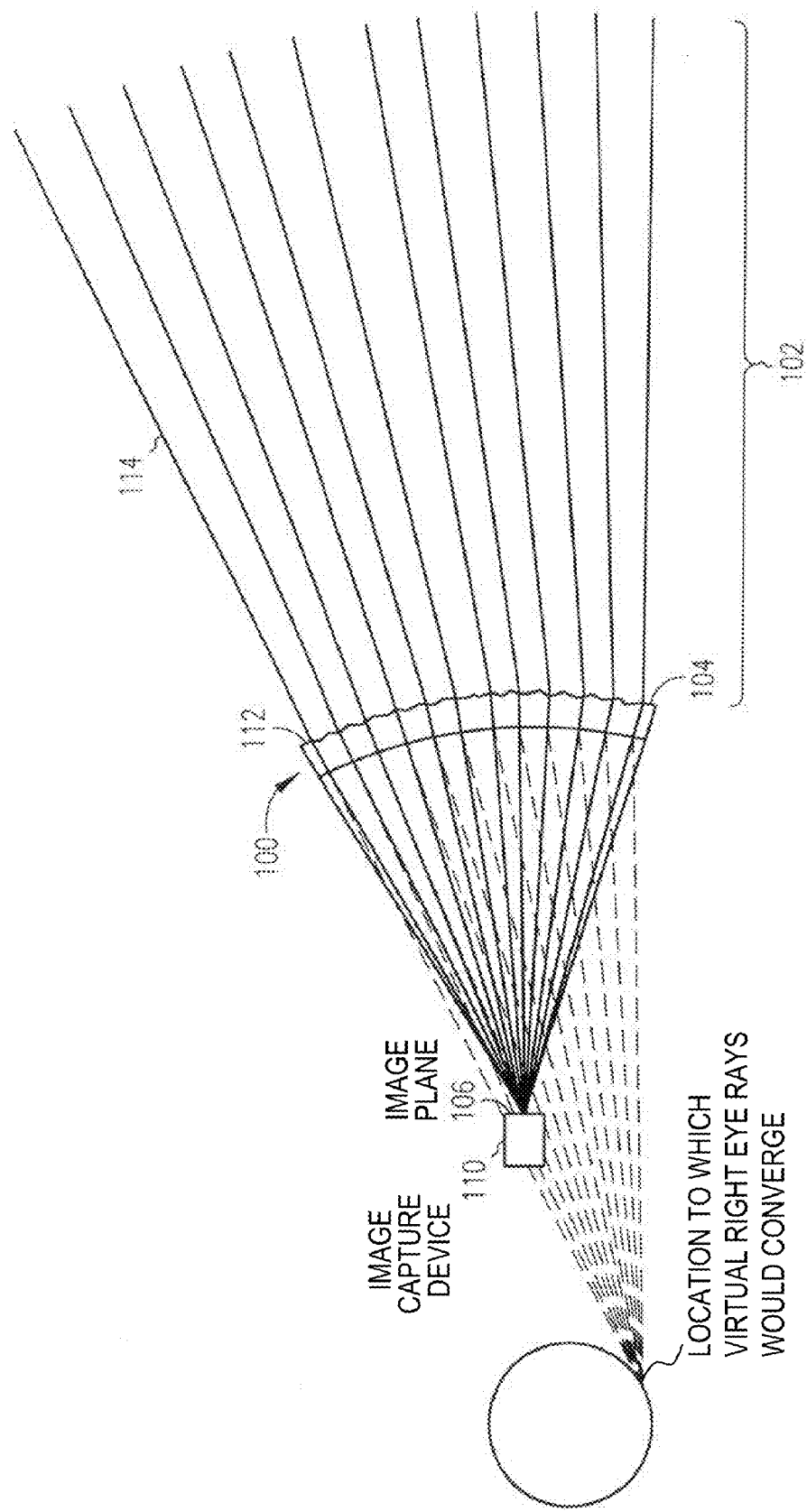
FIG. 1 is a top view of a lens refracting right eye rays according to various embodiments.

Various embodiments disclosed herein may address some of the challenges described above by extending representations of two-dimensional concepts into three-dimensional space so that three-dimensional image capture and projection may be accomplished in a more efficient and economical manner. Once the desired incident and refracted rays for a particular lens have been determined, the lens surface normal vector to achieve the desired refraction can be calculated. A particular point on the lens surface, along with the surface normal vector, may then be used to describe an infinite plane that, when clipped, can be used to define a facet formed in the lens. A plurality of facets may thus be selected to provide a lens that more accurately matches the viewing projections of many image capture and projection devices in a variety of orientations.

It should be noted that the quality of the stereoscopic effect created using two cameras may be governed by the distance separating the centers of the camera lenses. When the lenses are separated by an amount approximating the average human inter-ocular distance (i.e., about 6.4 centimeters, or the average distance between the pupils of the left and right eyes), the stereoscopic effect may accurately mimic human vision. If the cameras are placed closer together, the three dimensional depth of the captured scene may diminish. If they are placed farther apart, the three dimensional depth may increase. Thus, many stereoscopic camera systems use a camera or lens separation of about 6.4 centimeters.

As a part of creating the components of a new apparatus and system for stereoscopic imaging, one may consider the previously-described, rotating two-camera model, abstracting a small vertical image strip from each panorama to a single ray, terminating at the center of each camera's image acquisition plane. When two cameras are rotated about a common center point, these rays rotate along a path that is tangential to a circle having a diameter equivalent to the distance separating the two cameras. As noted previously, the diameter of the central circular path may govern the perceived inter-ocular distance of the resulting cylindrical stereoscopic panorama. In order to design a camera system capable of capturing a moving cylindrical stereoscopic image (e.g., video) in real time, it may be convenient to construct an apparatus to capture all of these rays at substantially the same time. However, since it is not convenient to arrange several cameras around a 6.4 cm diameter circle, a mechanism that allows a video camera (or other image capture device) of arbitrary size to capture alternating left and right eye rays from outside of the center inter-ocular circle may be needed.

To simplify the resulting apparatus, the cylindrical field of view may be divided into smaller pieces, each covered by an individual image capture device. To capture the left eye rays and right eye rays for each device, a lens and an apparatus may be constructed to interlace them. Conceptually, this interlacing is a simple horizontal alternation of left eye rays and right eye rays. This effect can be achieved using a lens specifically designed to refract left and right eye rays in an unusual way.

This lens may be designed to encompass the entire surface area of a cylinder surrounding a multi-camera assembly. However, the radial symmetry of a multi-camera assembly helps simplify the lens design process. Instead of using a single unified cylindrical lens to refract the incoming light rays, the cylindrical surface can be separated into several identical portions, or segments. The area of the cylindrical surface corresponding to a single video camera can thus be isolated, and the isolated lens segment can be designed in relation to its corresponding video camera. The resulting combination of a lens segment and video camera can then be replicated to comprise the remaining area of the cylindrical image acquisition assembly.

Thus, each lens or lens segment may be designed to refract various incoming light rays, corresponding to the left and right eye viewing rays, into its respective video camera. Since the left and right eye rays pass through the cylindrical lens surface in a non-symmetrical way, a uniform lens surface may not properly accomplish such refraction.

Figure 2:
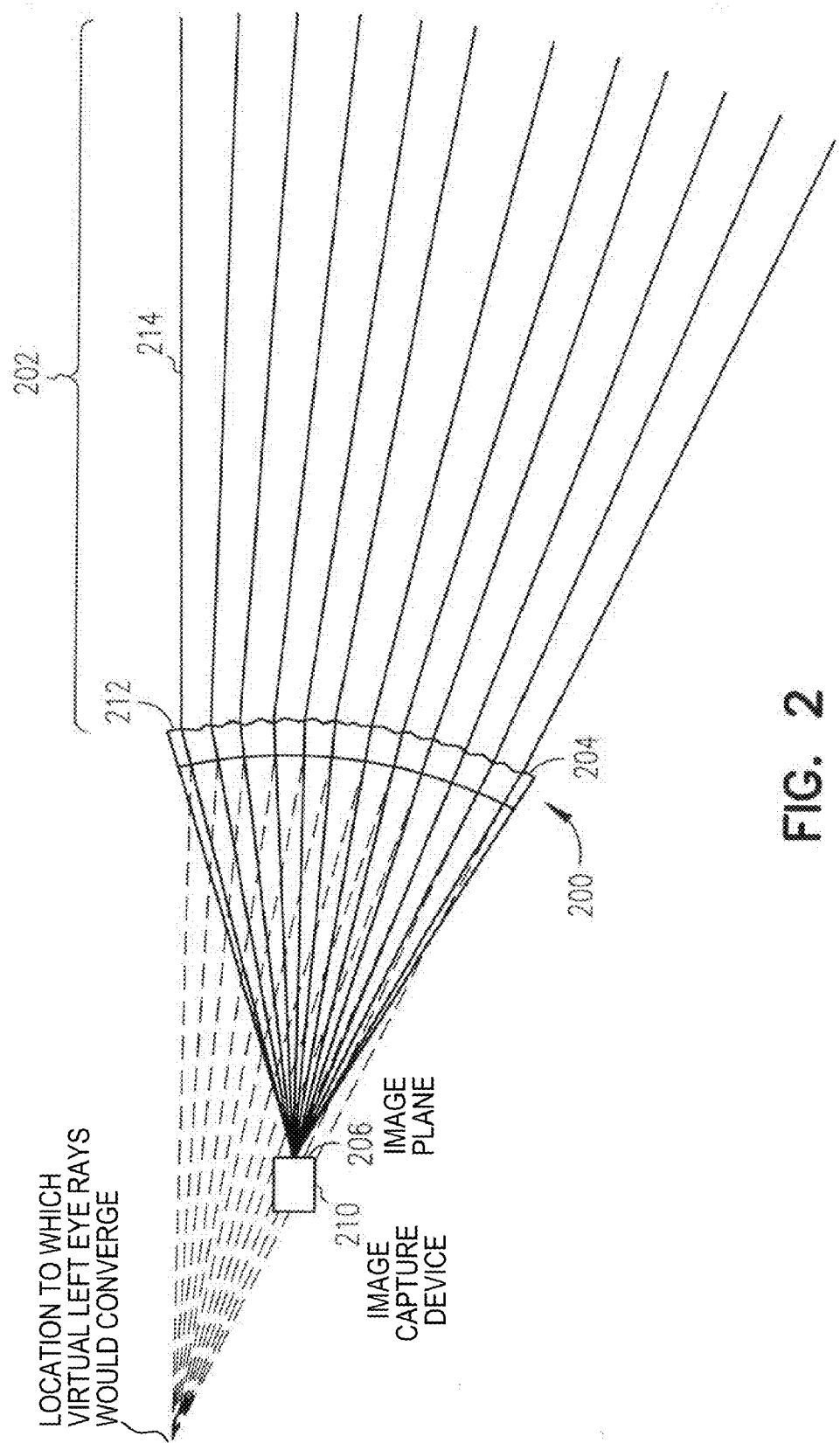
FIG. 2 is a top view of a lens refracting left eye rays according to various embodiments.

FIG. 1 is a top view of a lens 100 refracting right eye rays 102 according to various embodiments, and FIG. 2 is a top view of a lens 200 refracting left eye rays 202 according to various embodiments. It can be seen that a faceted lens 100, 200 has an outer surface 104, 204 (i.e., the faceted surface) designed to refract right eye rays 102 and left eye rays 202 onto the image acquisition plane 106, 206 of a video camera 110, 210, or other image capture device. Using the faceted lens surface 104, 204, individual vertical lens facets 112, 212 are used to refract individual vertical spans of eye rays 114, 214 into individual vertical lines of pixels included in the video camera's 110, 210 captured image acquisition plane 106, 206.

Figure 3:
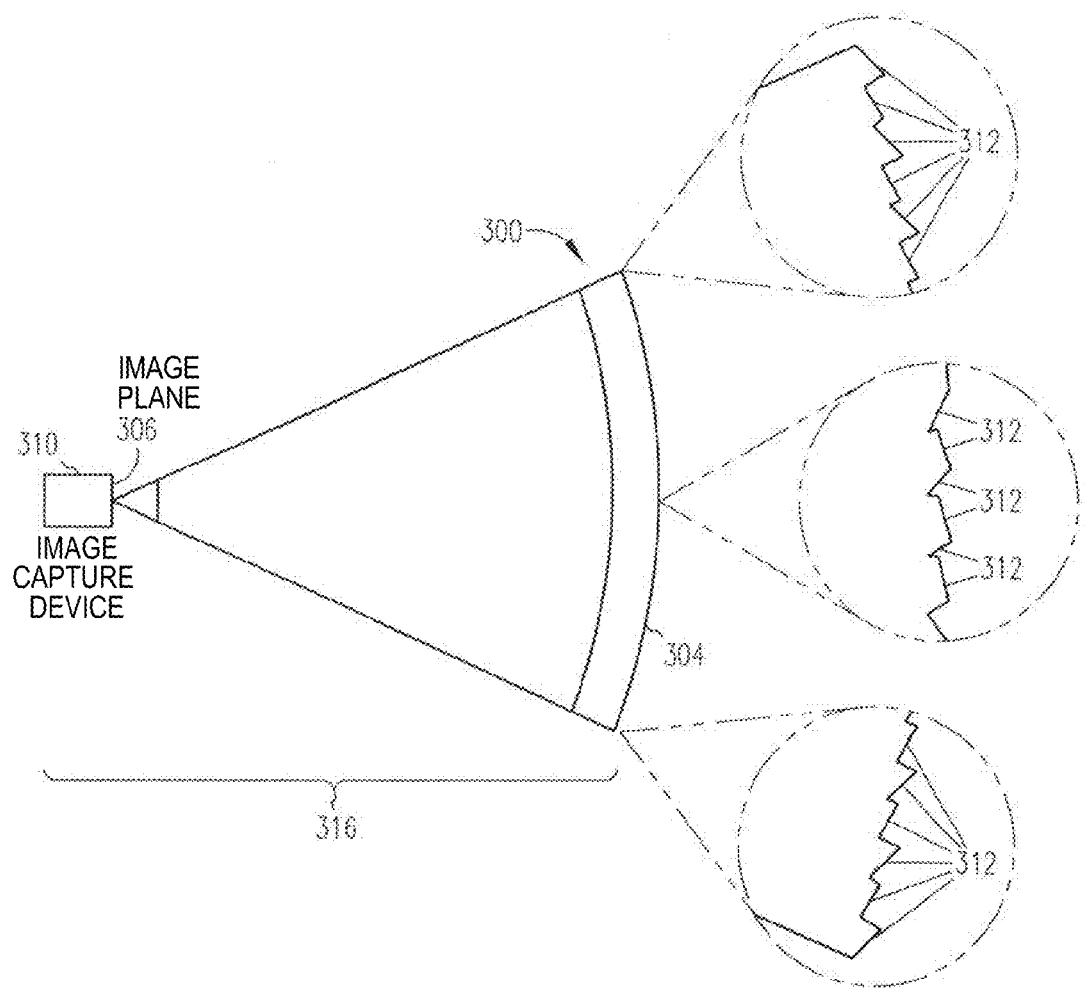
FIG. 3 is a top view of a lens and apparatus according to various embodiments.

FIG. 3 is a top view of a lens 300 and apparatus 316 according to various embodiments of the invention. In this case, the individual lens facets 312 for left and right eye rays are alternated along the outer surface 304 of the lens 300 in order to capture both left eye rays and right eye rays at substantially the same time. The rays can be refracted onto the image acquisition plane 306 of the video camera 310, or other image capture device.

The use of an interlaced, faceted lens 300 allows the video camera 310 (or other image capture device) to capture a sequence of vertically interlaced images. Since this vertical interlacing pattern remains constant throughout the entire video sequence, the left and right eye imagery can be isolated and separated in real time. The uniformly radial, tangential nature of the captured left and right eye rays allows several of these lens-camera apparatus to be placed next to one another to extend the cylindrical field of view of the overall device. Thus, it is the combination apparatus 316, comprising the lens 300 and the video camera 310, or other image capture device, that may be replicated a number of times to provide a panoramic, stereoscopic image capture system. For the purposes of this document, the term "panoramic" means an image, either monoscopic or stereoscopic, having a field of view of from about 60 degrees up to about 360 degrees.

Figure 4:
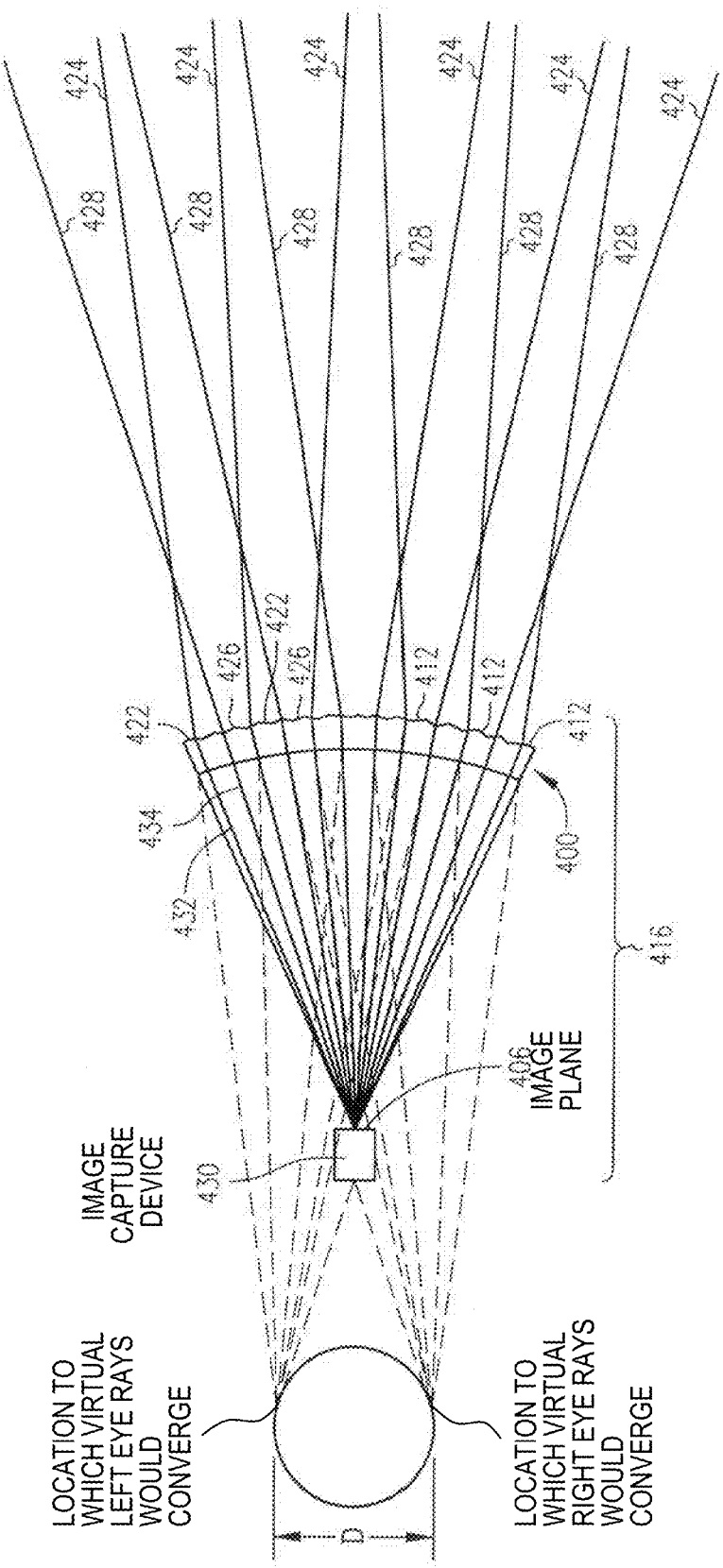
FIG. 4 is a top view of an apparatus according to various embodiments.

FIG. 4 is a top view of an apparatus 416 according to various embodiments. In this illustration, the apparatus 416, which may be similar to or identical to the apparatus 316 is shown, along with the relevant inter-ocular distance D. The apparatus 416 may include a lens 400 having a plurality of interleaved separating facets 412 including a first separating facet 422 to refract left eye rays 424 and a second separating facet 426 to refract right eye rays 428. The apparatus 416 may also include an image acquisition plane 406 (perhaps as part of an image capture device 430, such as a frame-grabber, digital video camera, or some other device) to receive a refracted left eye ray 432 from the first separating facet 422, and to receive a refracted right eye ray 434 from the second separating facet 426.

Figure 5:
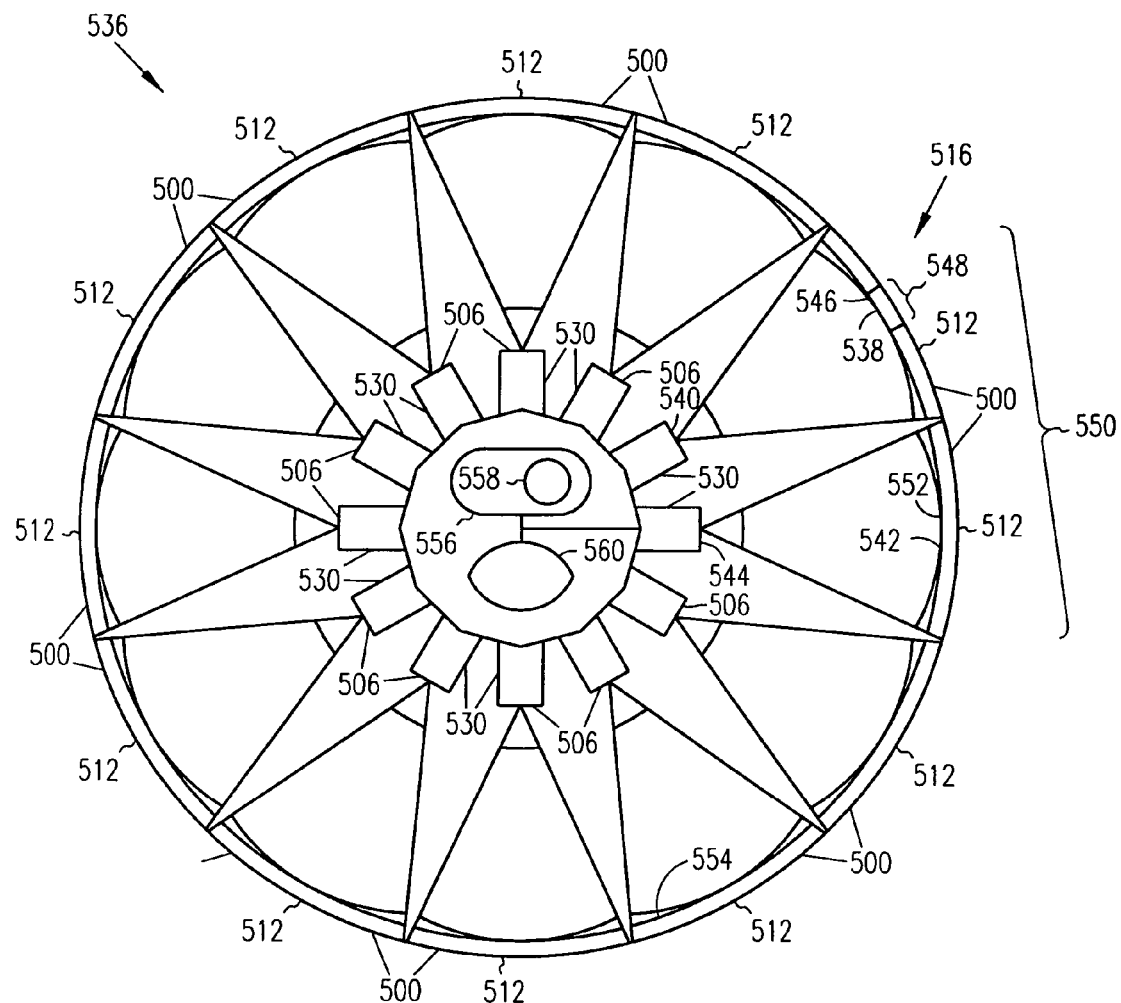
FIG. 5 is a top view of an apparatus and a system according to various embodiments.

FIG. 5 is a top view of an apparatus 516 and a system 536 according to various embodiments. The apparatus 516 may include a first lens 538 and a first image acquisition plane 540 as shown in FIG. 4 with respect to apparatus 416. The apparatus 516 may also include a second lens 542 and image acquisition plane 544. The first lens 538 and first image acquisition plane 540 may be similar to or identical to the lens 400 and image acquisition plane 406 shown in FIG. 4. The second lens 542 and second image acquisition plane 544 may also be similar to or identical to the lens 400 and image acquisition plane 406 shown in FIG. 4, such that the second lens 542 may have a second plurality of interleaved separating facets (not shown in FIG. 5) including a third separating facet to refract left eye rays and a fourth separating facet to refract right eye rays. The second image acquisition plane 544 may be used to receive a second refracted left eye ray from the third separating facet, and to receive a second refracted right eye ray from the fourth separating facet, as described with respect to the apparatus 416 depicted in FIG. 4.

The first lens 538 may have a first inner radius 546 defining a portion 548 of a cylindrical section 550, and the second lens 542 may have a second inner radius 552 located approximately on a cylinder 554 defined by the portion 548 of the cylindrical section 550. Thus, the lenses 400, 500 may include an inner radius 546 defining a portion 548 of a cylindrical section 550, as well as an outer radius 551 along which are approximately located a plurality of separating facets 512. The plurality of facets 512 may include a plurality of left eye ray separating facets interleaved with a plurality of right eye ray separating facets (see FIG. 4, elements 412, 422, and 426). Ultimately, an entire 360-degree cylindrical field of view can be achieved.

Figure 6:
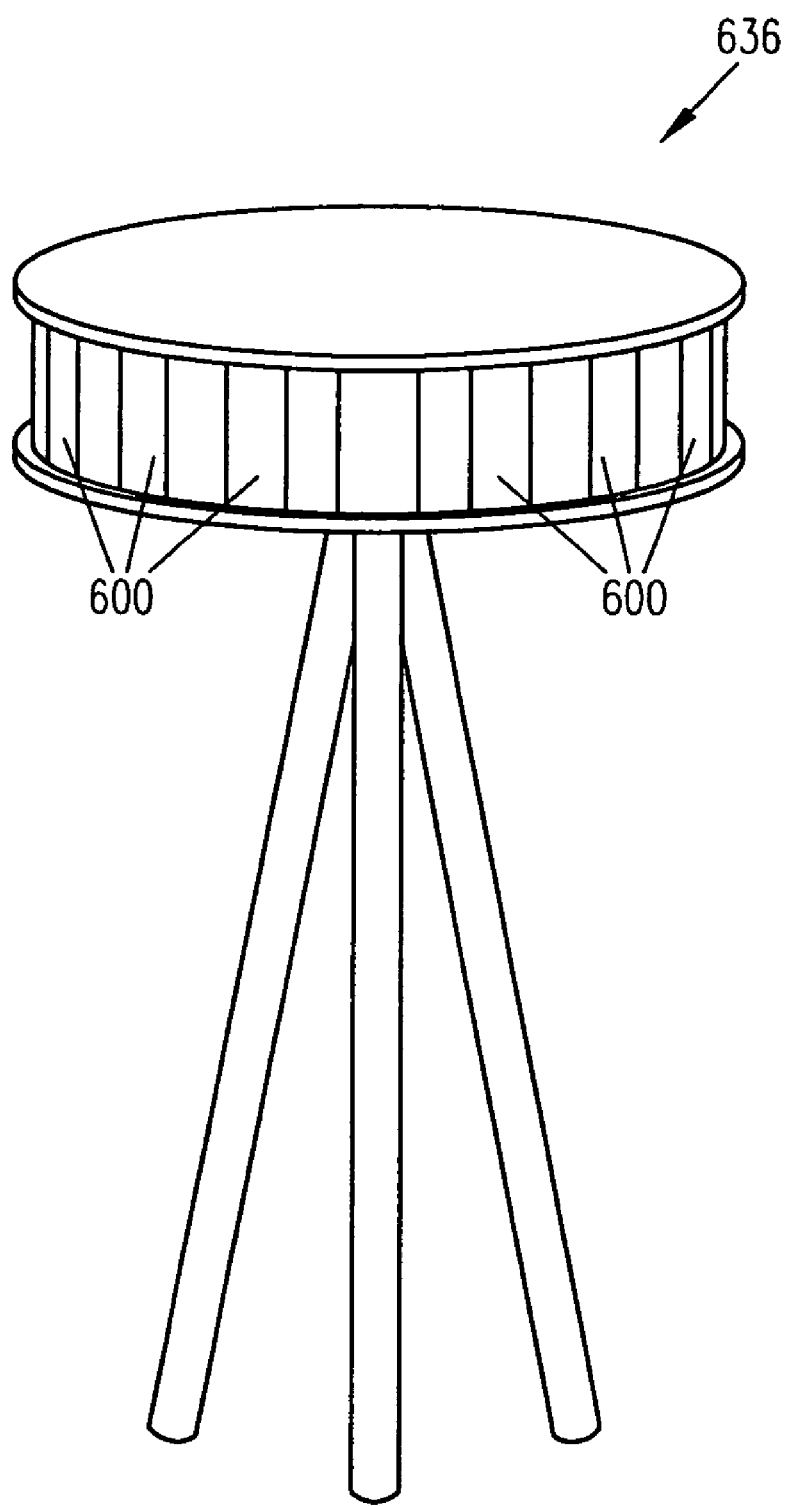
FIG. 6 is a perspective view of a system according to various embodiments.

FIG. 6 is a perspective view of a system 636 according to various embodiments. Referring now to FIGS. 5 and 6, it can be seen that a system 536, 636 may include a plurality of lenses 500, 600. The lenses 500, 600 may be similar to or identical to the lens 400 shown in FIG. 4, having a plurality of interleaved facets 412, 512. The system 536, 636 may also include a plurality of image acquisition planes 506 (not shown in FIG. 6) to receive refracted left eye rays from first separating facets in the lenses 500, 600, and to receive refracted right eye rays from second separating facets in the lenses 500, 600. The system 536, 636 may include a memory 556 (not shown in FIG. 6) to receive image data 558 (not shown in FIG. 6) from the plurality of image acquisition planes 506.

The image data 558 may include information to construct a stereoscopic image, including a panoramic stereoscopic image. The image data 558 may include a separated left eye image and a separated right eye image. The system 536, 636 may also include a processor 560 coupled to the memory 556 to join the separated left eye image and the separated right eye image (e.g. see elements 770, 772 of FIG. 7). As noted previously, when several apparatus 416 (see FIG. 4) are placed next to each other, in a manner similar to or identical to that shown in FIG. 5 with respect to apparatus 516, the resulting extracted left and right eye imagery can also be placed next to each other in real time to create uniform, seamless left and right eye panoramic imagery (see elements 774, 776 of FIG. 7). This process will now be examined in more detail.

FIGS. 7A-7E illustrate portions of a stereoscopic panorama creation process according to various embodiments. This process permits real-time capture of 360-degree, cylindrical stereoscopic video imagery. In FIG. 7A, a single apparatus 716, including a lens 700 (similar to or identical to the lens 400 shown in FIG. 4) and an image capture device 730 (similar to or identical to the image capture device 430 of FIG. 4), is shown being used to capture an image of various objects 762. FIG. 7B depicts an approximation of an interlaced image 764 captured by the image capture device 730 via the faceted lens 700 (e.g., constructed from a plurality of captured left eye rays and a plurality of captured right eye rays). FIG. 7C shows de-interlaced left and right eye image strips 766, 768 constructed from the interlaced image 764. FIG. 7D shows concatenated left and right image sections 770, 772, or separated left and right eye images, constructed from the de-interlaced left and right eye image strips 766, 768, respectively. Finally, FIG. 7E shows left and right eye panoramic images 774, 776, respectively, obtained by joining together a number of left and right image sections obtained from adjoining apparatus 716, including left and right image sections 770, 772, arranged in a manner similar to or identical to that of the apparatus 516 in FIG. 5. When the left panoramic image 774 is viewed by the left eye, and the right panoramic image 776 is viewed by the right eye, a stereoscopic, panoramic (e.g., up to 360 degree) view of the objects 762 can be re-created.

Figure 8:
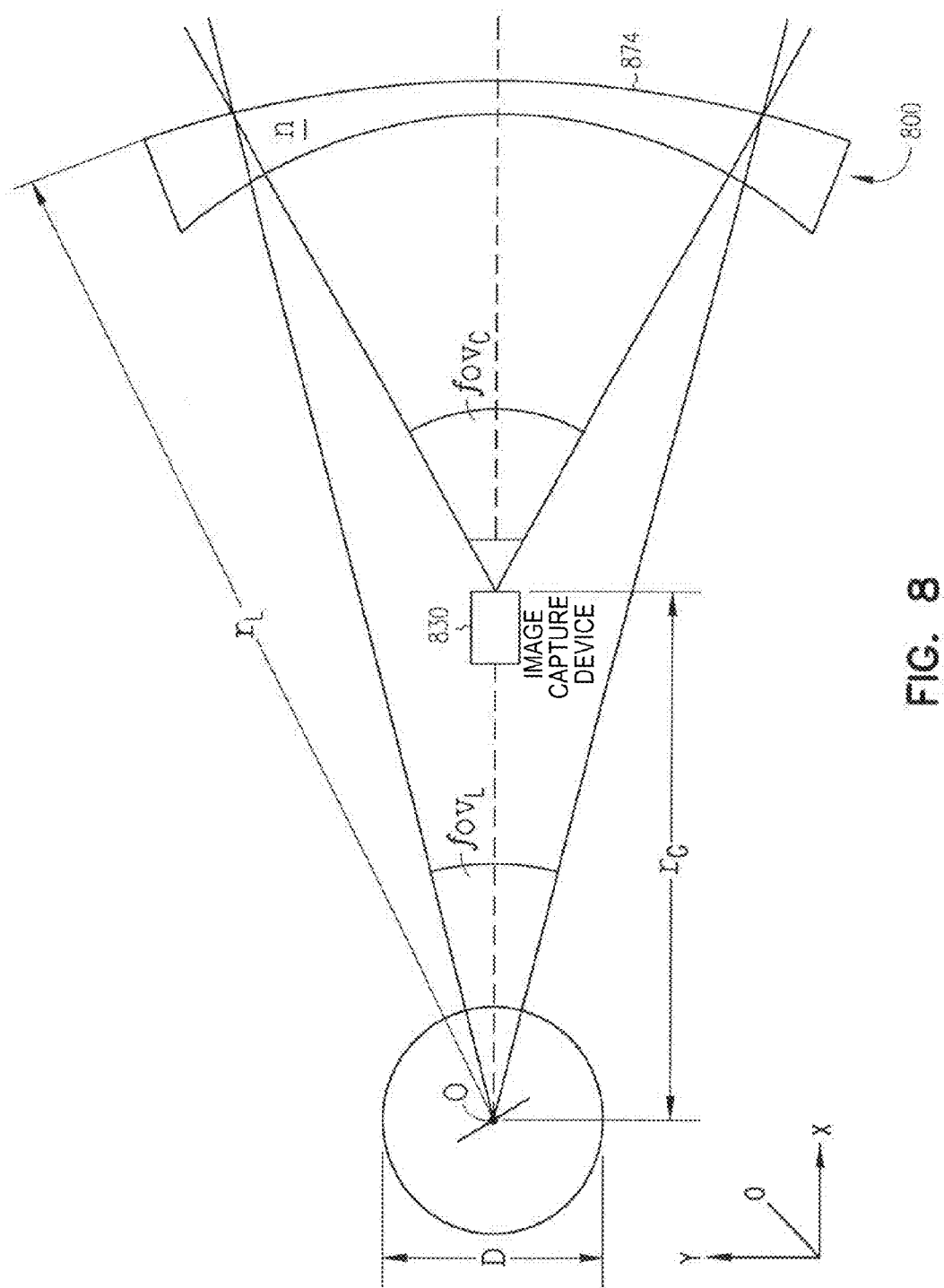
FIG. 8 illustrates several fields of view relating to a lens according to various embodiments.

FIG. 8 illustrates several fields of view relating to a lens 800 according to various embodiments. Lens 800 may be similar to or identical to the lens 400 shown in FIG. 4. A faceted lens 800 that performs the refraction to achieve the desired stereoscopic effect can be described mathematically based on certain specified physical values. These values include the inter-ocular distance (D) that provides the desired stereoscopic effect, the index of refraction (n) of the material to be used to create the faceted lens, the distance from the center of eye point rotation to the image capture device ($r_c$), the effective horizontal field of view of the image capture device ($fov_c$), and the effective horizontal field of view of the apparatus's faceted lens section ($fov_l$). The distance D may be a selected inter-ocular distance, which can be any desired distance, but which is most useful when selected to be approximately 4 centimeters to approximately 8 centimeters.

The subsequent mathematical process assumes an x-y coordinate system, having an origin O at the center of eye point rotation. All angular measurements are in degrees. The radius ($r_l$) of the external faceted lens surface 874 corresponds to the distance at which the field of view of the image capture device ($fov_c$) overlaps the field of view of the faceted lens section ($fov_l$), and can be calculated as follows:

$$r_l = \frac{r_c * \tan\left(\frac{fov_c}{2}\right)}{\cos\left(\frac{fov_l}{2}\right) * \tan\left(\frac{fov_c}{2}\right) - \sin\left(\frac{fov_l}{2}\right)}$$

Once the radius of the lens 800 has been determined, individual facet properties can be calculated. These facet properties can be calculated on a ray-by-ray basis, allowing for the design of a lens with any number of facets. For the purpose of this document, it may be assumed that an optimal image is attained using a single facet for each vertical pixel line acquired by the image capture device 830.

Figure 9:
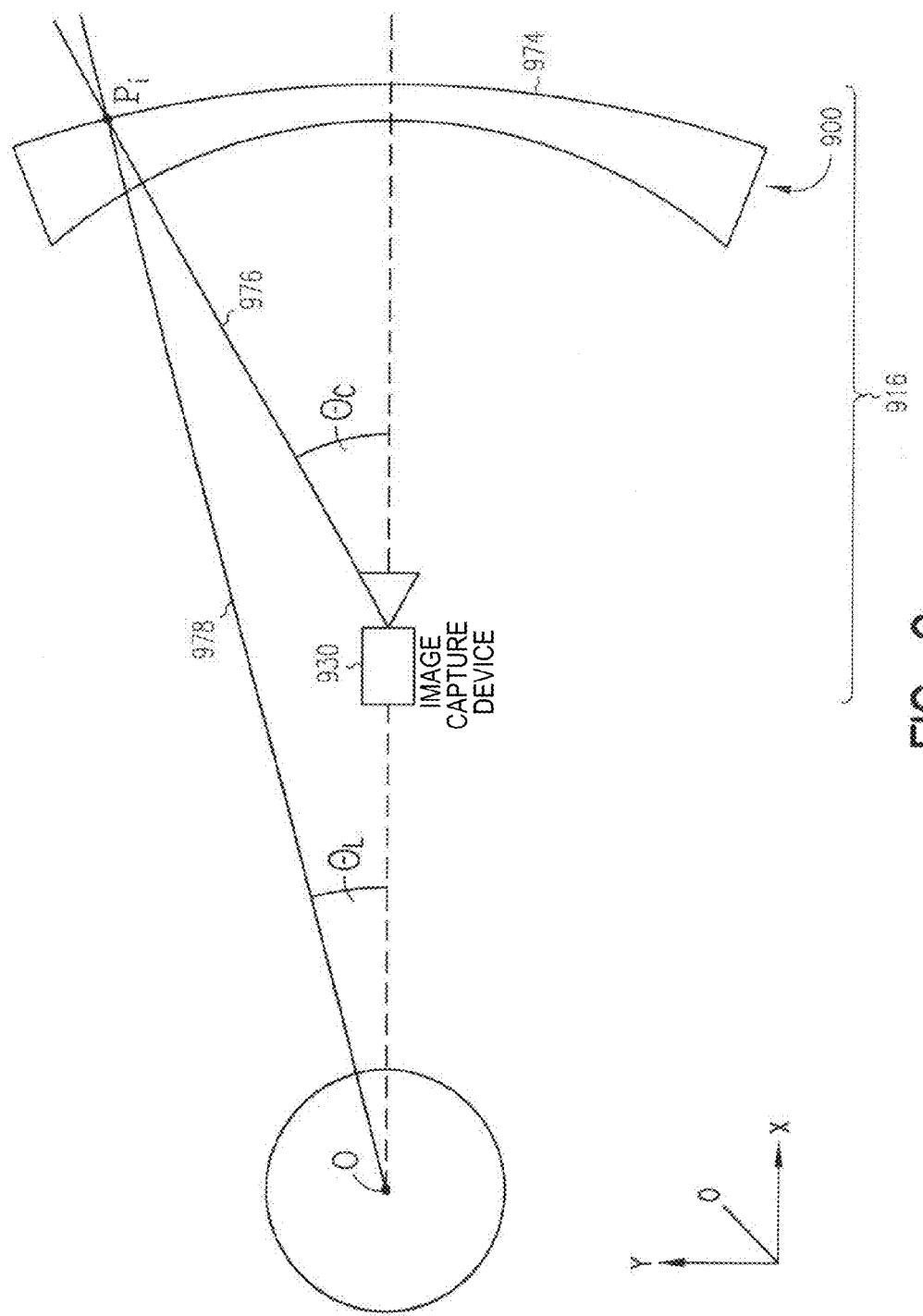
FIG. 9 is a top view of lens surface point ray angles relating to a lens according to various embodiments.

FIG. 9 is a top view of lens surface point ray angles relating to a lens 900 according to various embodiments. Lens 900 may be similar to or identical to the lens 400 shown in FIG. 4. The lens facet properties corresponding to a particular point on the lens surface 974 are dependent on the location of that point ($P_i$) and the angle of the ray 976 from the image capture device 930 to that point ($\Theta_c$). The apparatus 916 (which may be similar to or identical to the apparatus 416 shown in FIG. 4) can be designed such that the lens surface area corresponding to the field of view of the image capture device ($fov_c$) matches the lens surface area corresponding to the field of view of the faceted lens section ($fov_l$) (see FIG. 8). As a result, a ray 978 from the center of eye point rotation O may intersect the lens surface at the same point ($P_i$). The angle ($\Theta_l$) of that ray 978 can be calculated as follows:

$$\Theta_l = \frac{fov_l * \Theta_c}{fov_c}$$

Figure 10:
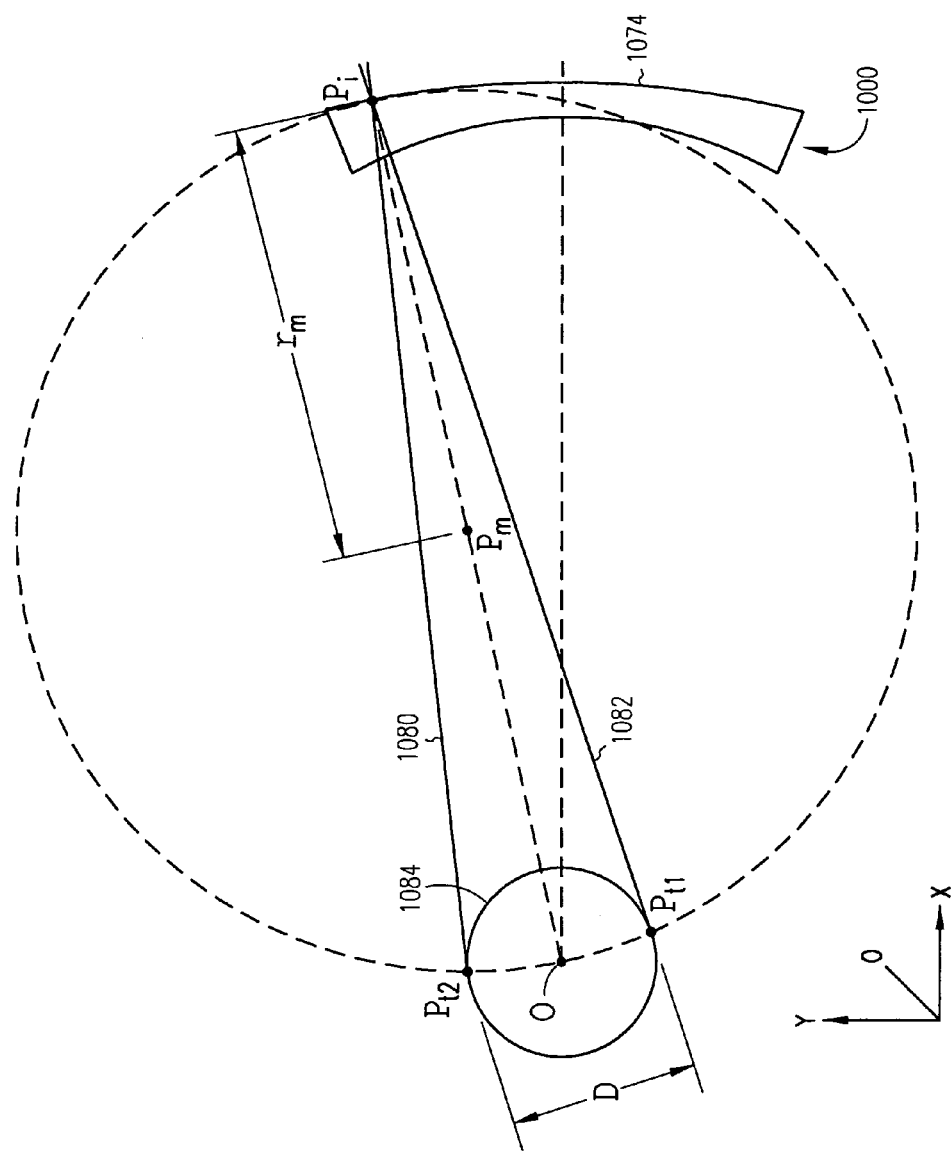
FIG. 10 is a top view of eye ray angles relating to a lens according to various embodiments.

This ray angle ($\Theta_l$) allows calculation of the lens surface intersection point ($P_i = P_{ix}, P_{iy}$ in x-y coordinates) as follows:

$P_i = (P_{ix}, P_{iy})$ $P_{ix} = r_l * \cos(\Theta_l)$ $P_{iy} = r_l * \sin(\Theta_l)$, FIG. 10 is a top view of eye ray angles relating to a lens 1000 according to various embodiments. Lens 1000 may be similar to or identical to lens 400 shown in FIG. 4. The lens facet residing at the lens surface intersection point ($P_i$) should preferably be oriented to capture either one of the desired left eye rays 1080 or right eye rays 1082, tangential to the circular path of eye rotation 1084 (having a diameter approximately equal to the inter-ocular distance D) and passing through the lens surface intersection point ($P_i$). By designating point $P_m$ as the midpoint between the lens surface intersection point $P_i$ and the center of rotation O, and radius $r_m$ as the radius of the circle defined by a diameter substantially equal to the distance from the center of rotation and the point $P_i$, the points of tangency ($P_{t1}$ and $P_{t2}$) can be calculated via the following process:

$$P_m = (P_{mx}, P_{my}) = \left(\frac{P_{ix}}{2}, \frac{P_{iy}}{2}\right)$$

-continued $$r_m = \sqrt{(P_{mx} - P_{ix})^2 + (P_{my} - P_{iy})^2}$$

$$d = \sqrt{P_{mx}^2 + P_{my}^2}$$

$$P_{t1} = (P_{t1x}, P_{t1y})$$

$$P_{t1x} = \left(\frac{P_{mx}}{2}\right) + \left(\frac{P_{mx} * \left(\left(\frac{D}{2}\right)^2 - r_m^2\right)}{2d^2}\right) + \left(\frac{P_{my}}{2d^2}\right) * \sqrt{\left(\left(\frac{D}{2} + r_m\right)^2 - d^2\right) * \left(d^2 - \left(r_m - \frac{D}{2}\right)^2\right)}$$

$$P_{t1y} = \left(\frac{P_{my}}{2}\right) + \left(\frac{P_{my} * \left(\left(\frac{D}{2}\right)^2 - r_m^2\right)}{2d^2}\right) - \left(\frac{P_{mx}}{2d^2}\right) * \sqrt{\left(\left(\frac{D}{2} + r_m\right)^2 - d^2\right) * \left(d^2 - \left(r_m - \frac{D}{2}\right)^2\right)}$$

$$P_{t2} = (P_{t2x}, P_{t2y})$$

$$P_{t2x} = \left(\frac{P_{mx}}{2}\right) + \left(\frac{P_{mx} * \left(\left(\frac{D}{2}\right)^2 - r_m^2\right)}{2d^2}\right) - \left(\frac{P_{my}}{2d^2}\right) * \sqrt{\left(\left(\frac{D}{2} + r_m\right)^2 - d^2\right) * \left(d^2 - \left(r_m - \frac{D}{2}\right)^2\right)}$$

$$P_{t2y} = \left(\frac{P_{my}}{2}\right) + \left(\frac{P_{my} * \left(\left(\frac{D}{2}\right)^2 - r_m^2\right)}{2d^2}\right) + \left(\frac{P_{mx}}{2d^2}\right) * \sqrt{\left(\left(\frac{D}{2} + r_m\right)^2 - d^2\right) * \left(d^2 - \left(r_m - \frac{D}{2}\right)^2\right)}$$

Figure 11:
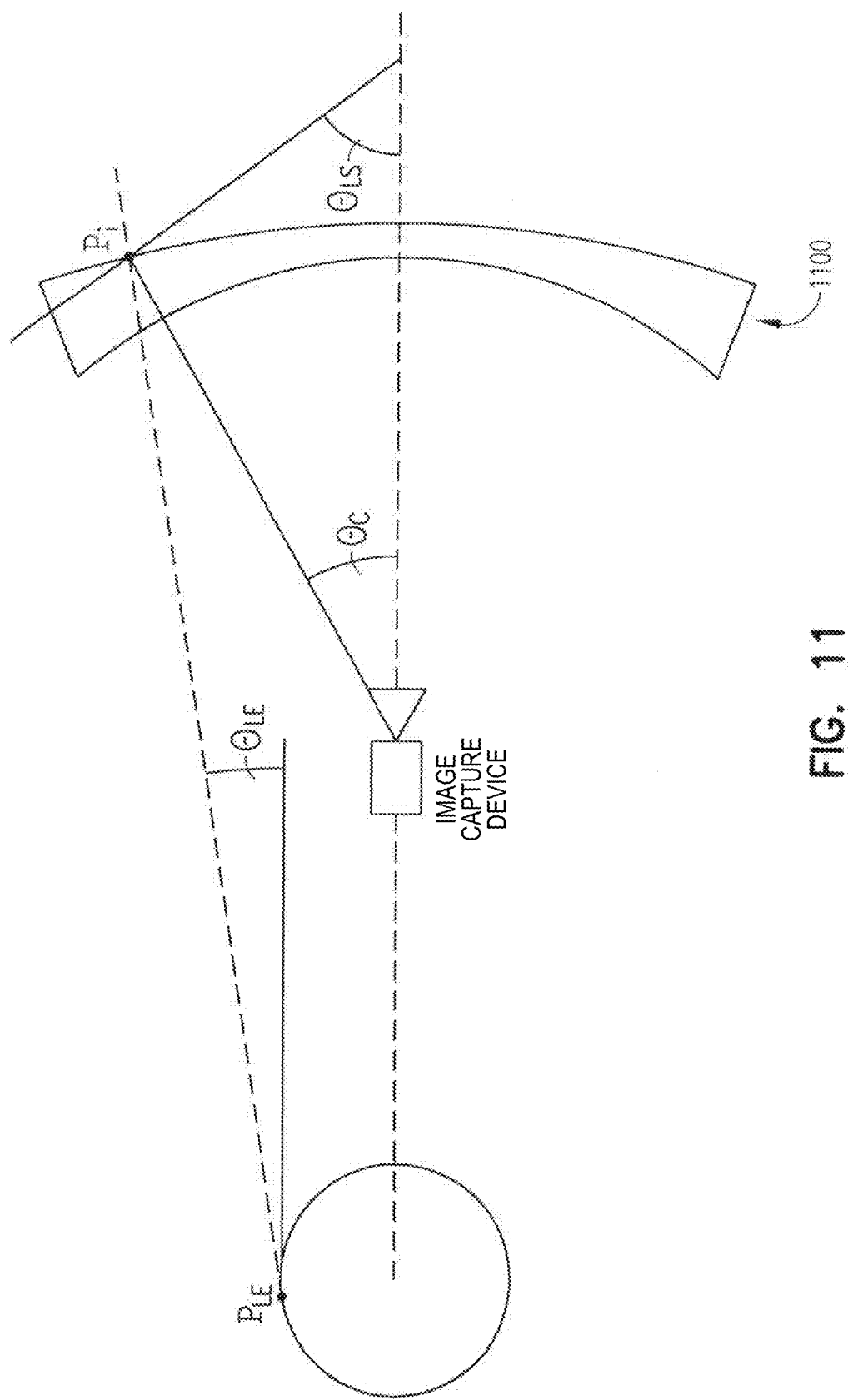
FIG. 11 is a top view of lens facet orientation angles relating to a lens according to various embodiments.
Figure 12:
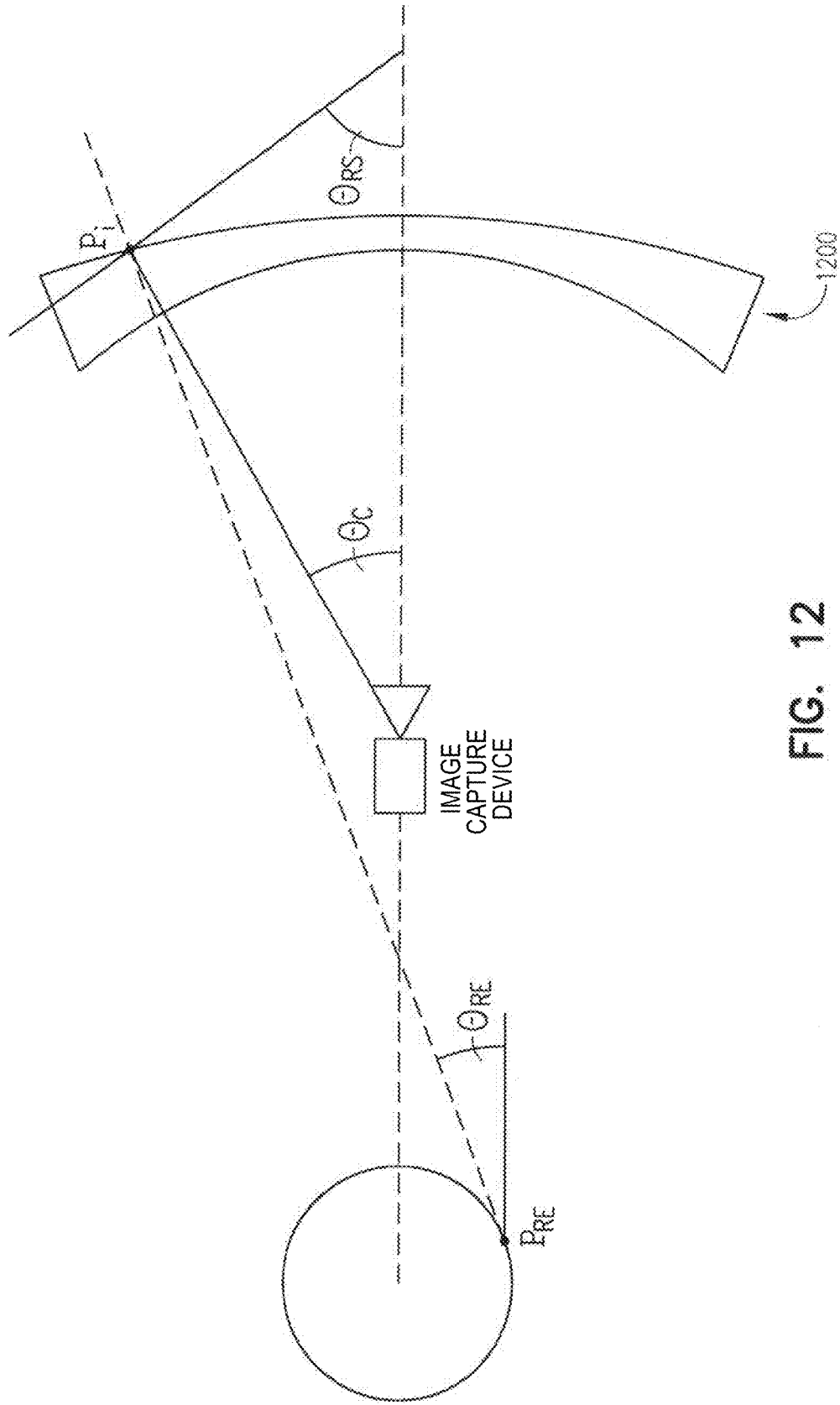
FIG. 12 is a top view of additional lens facet orientation angles relating to a lens according to various embodiments.

FIG. 11 is a top view of lens facet orientation angles relating to a lens 1100 according to various embodiments. FIG. 12 is a top view of additional lens facet orientation angles relating to a lens 1200 according to various embodiments. Lenses 1100, 1200 may be similar to or identical to the lens 400 shown in FIG. 4. Referring now to FIGS. 10, 11, and 12, it can be seen that the two calculated points of tangency ($P_{t1}$, and $P_{t2}$), when viewed in conjunction with the lens surface intersection point ($P_i$), may correspond to the desired left eye ray ($P_{LE}$) and right eye ray ($P_{RE}$) that pass through the lens surface at that point.

$$P_{RE} = (P_{REx}, P_{REy}) = P_{t1}$$

$$P_{LE} = (P_{LEx}, P_{LEy}) = P_{t2}$$

The angle formed between each eye ray and the x-axis ($\Theta_{RE}$ and $\Theta_{LE}$, respectively) is useful in calculating the refraction properties of the current lens surface facet for each eye ray. These angles can be calculated as follows:

$$\Theta_{RE} = \arctan\left(\frac{P_{REy} - P_{iy}}{P_{REx} - P_{ix}}\right)$$

$$\Theta_{LE} = \arctan\left(\frac{P_{LEy} - P_{iy}}{P_{LEx} - P_{ix}}\right)$$

Once the eye ray angles ($\Theta_{RE}$ and $\Theta_{LE}$) have been calculated, the final facet properties may be calculated for the current lens position, taking into account the index of refraction n. The current facet may be chosen to perform refraction that will capture either the left eye ray ($\Theta_{LE}$) or the right eye ray ($\Theta_{RE}$). In order to perform the desired refraction, the lens facet must be oriented such that the incoming eye ray ($\Theta_{RE}$ or $\Theta_{LE}$) is refracted to match the current camera ray ($\Theta_c$). The lens facet orientation ($\Theta_{RS}$ or $\Theta_{LS}$) can be calculated as follows:

$$\Delta\Theta_R = \Theta_c - \Theta_{RE}$$

$$\Theta_{RS} = 90° - \Theta_c - \arctan\left(\frac{\sin(\Delta\Theta_R)}{n - \cos(\Delta\Theta_R)}\right)$$

$$\Delta\Theta_L = \Theta_c - \Theta_{LE}$$

$$\Theta_{LS} = 90° - \Theta_c - \arctan\left(\frac{\sin(\Delta\Theta_L)}{n - \cos(\Delta\Theta_L)}\right)$$

The entire process can be repeated on a facet-by-facet basis until the entire lens surface 1074 has been traversed.

Thus, in some embodiments, a lens 400, 500, 600, 700, 800, 900, 1000, 1100, 1200 may include an outer radius $r_l$ having a separating facet, such that $r_l$ is approximately equal to $$\frac{r_c * \tan\left(\frac{fov_c}{2}\right)}{\cos\left(\frac{fov_l}{2}\right) * \tan\left(\frac{fov_c}{2}\right) - \sin\left(\frac{fov_l}{2}\right)},$$

wherein $r_c$ comprises a distance from a center of rotation to an image acquisition plane, $fov_c$ comprises an effective horizontal field of view for the image acquisition plane, and $fov_l$ comprises an effective horizontal field of view spanned by the lens (see especially FIG. 8).

In some embodiments, a lens 400, 500, 600, 700, 800, 900, 1000, 1100, 1200 may include one or more separating facets having a facet orientation selected from one of $\Theta_{RS}$ approximately equal to $$90° - \Theta_c - \arctan\left(\frac{\sin(\Delta\Theta_R)}{n - \cos(\Delta\Theta_R)}\right),$$

wherein $\Delta\Theta_R$ is approximately equal to an image capture device ray angle minus a selected eye ray angle, and $\Theta_{LS}$ approximately equal to $$90° - \Theta_c - \arctan\left(\frac{\sin(\Delta\Theta_L)}{n - \cos(\Delta\Theta_L)}\right),$$

wherein $\Delta\Theta_L$ is approximately equal to an image capture device ray angle minus another selected eye ray angle. Further, it has been shown that any number of image acquisition planes may be located at a radial distance $r_c$ from an origin point located at a center of a selected inter-ocular distance (e.g., an inter-ocular distance of approximately 4 cm to 8 cm). It has also been shown that an outer radius of the lens $r_l$ may correspond to a distance at which a field of view of the associated image acquisition plane overlaps a field of view of the lens.

Many other embodiments may be realized. While the figures so far have shown lenses and devices using lenses that allow a single image capture device to capture imagery from two distinct, separate viewpoints (e.g., left eye and right eye), the disclosed embodiments are not to be so limited. In fact, the formulas shown can be used to construct lenses, image capture devices, and projectors that operate using three or more viewpoints.

Figure 13:
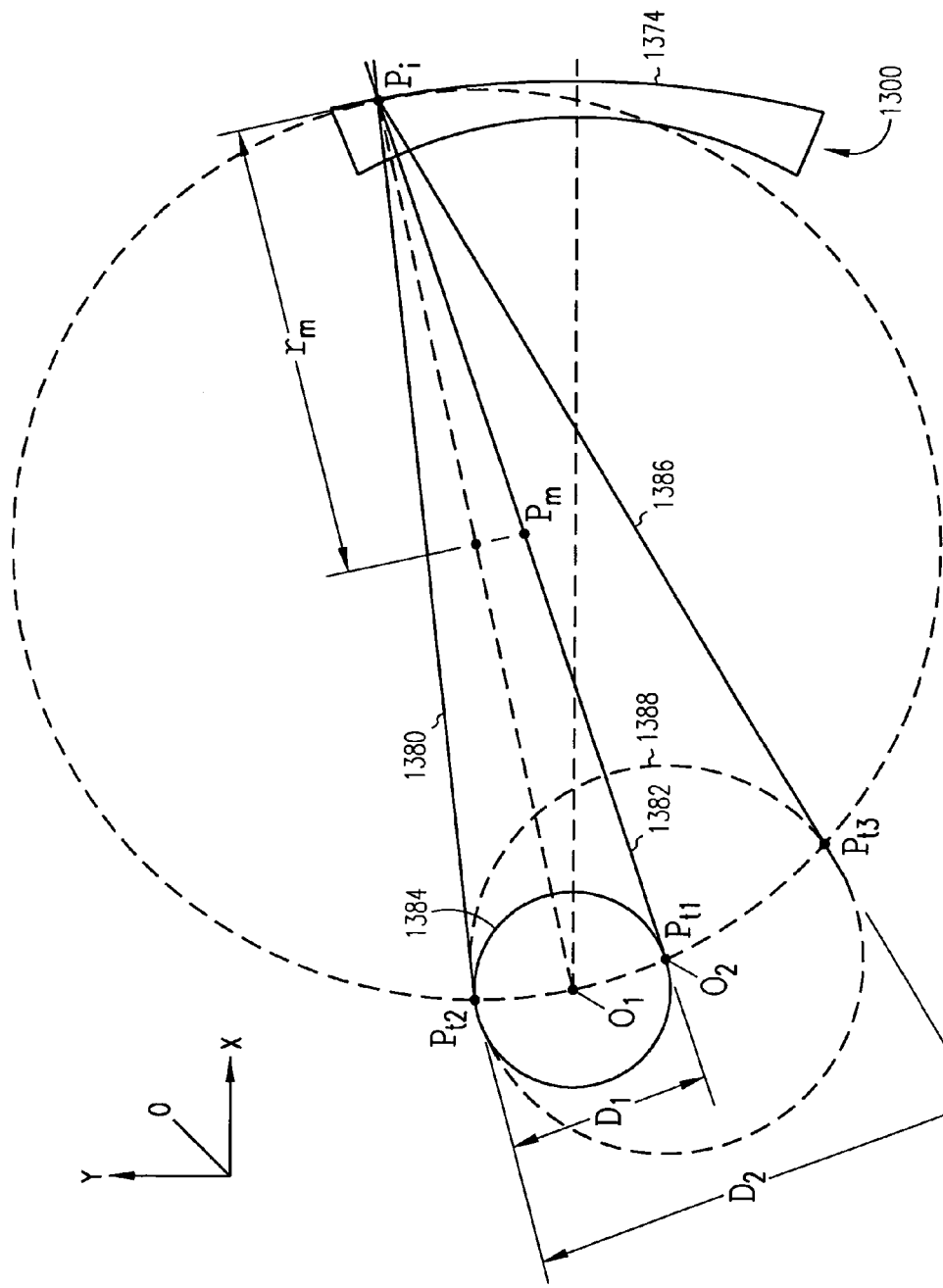
FIG. 13 is a top view of a multi-viewpoint lens according to various embodiments.

For example, FIG. 13 is a top view of a multi-viewpoint lens 1300 according to various embodiments. The lens 1300 may be similar to or identical to lens 400 shown in FIG. 4. The lens facet residing at the lens surface intersection point ($P_i$) should preferably be oriented to capture one of the desired left eye rays 1380, one of the right eye rays 1382, and/or an additional eye ray 1386 (e.g., a third viewpoint) tangential to a first circular path of eye rotation 1384 (having a diameter approximately equal to the inter-ocular distance $D_1$) or to a second circular path of eye rotation 1388 (having a diameter approximately equal to the inter-ocular distance $D_2$) and passing through the lens surface intersection point ($P_i$). Thus, any number of additional viewpoints may be accommodated by altering the inter-ocular distance (e.g., selecting $D_2$ instead of $D_1$), forming a new circular path of eye rotation (e.g., having a center of rotation at $O_2$ instead of $O_1$), and finding a new point of tangency (e.g., $P_{t3}$ instead of $P_{t1}$) on the circular path.

By designating point $P_m$ as the midpoint between the lens surface intersection point $P_i$ and the center of rotation $O_1$ (or $O_2$), and radius $r_m$ as the radius of the circle defined by a diameter substantially equal to the distance from the center of rotation and the point $P_i$, the points of tangency ($P_{t1}$, $P_{t2}$, or $P_{t3}$, $P_{t2}$) can be calculated by the same process as shown for FIG. 10. Facets for each of the viewpoints $P_{t1}$, $P_{t2}$, and $P_{t3}$ can be formed in the surface 1374 of the lens as described with respect to FIGS. 1-3 and 10-12, perhaps in an interleaved fashion.

Thus, many variations of the lens 1300 may be realized. For example, the lens 1300 may include a plurality of separating facets, such as left eye separating facets, right eye separating facets, and one or more additional eye ray separating facets (perhaps corresponding to multiple additional viewpoints).

An example of using the formulas shown above for such a multi-faceted lens include a lens 1300 having a first separating facet with a facet orientation of $\Theta_{RS}$ $$\left(\text{approximately equal to } 90° - \Theta_c - \arctan\left(\frac{\sin(\Delta\Theta_R)}{n - \cos(\Delta\Theta_R)}\right)\right),$$

where $\neq\Theta_R$ is approximately equal to the image capture device ray angle minus a selected first eye ray angle, a second separating facet with a facet orientation of $\Theta_{LS}$ $$\left(\text{approximately equal to } 90° - \Theta_c - \arctan\left(\frac{\sin(\Delta\Theta_L)}{n - \cos(\Delta\Theta_L)}\right)\right),$$

where $\Delta\Theta_L$ is approximately equal to the image capture device ray angle minus a second selected eye ray angle, and a third separating facet having a facet orientation of $\Theta_{TS}$ $$\left(\text{approximately equal to } 90° - \Theta_c - \arctan\left(\frac{\sin(\Delta\Theta_T)}{n - \cos(\Delta\Theta_T)}\right)\right),$$

where $\Delta\Theta_T$ is approximately equal to the image capture device ray angle minus a third selected eye ray angle.

The lens 1300 may form a portion of a multi-viewpoint image capture device, or a multi-image projection system.

Figure 14:
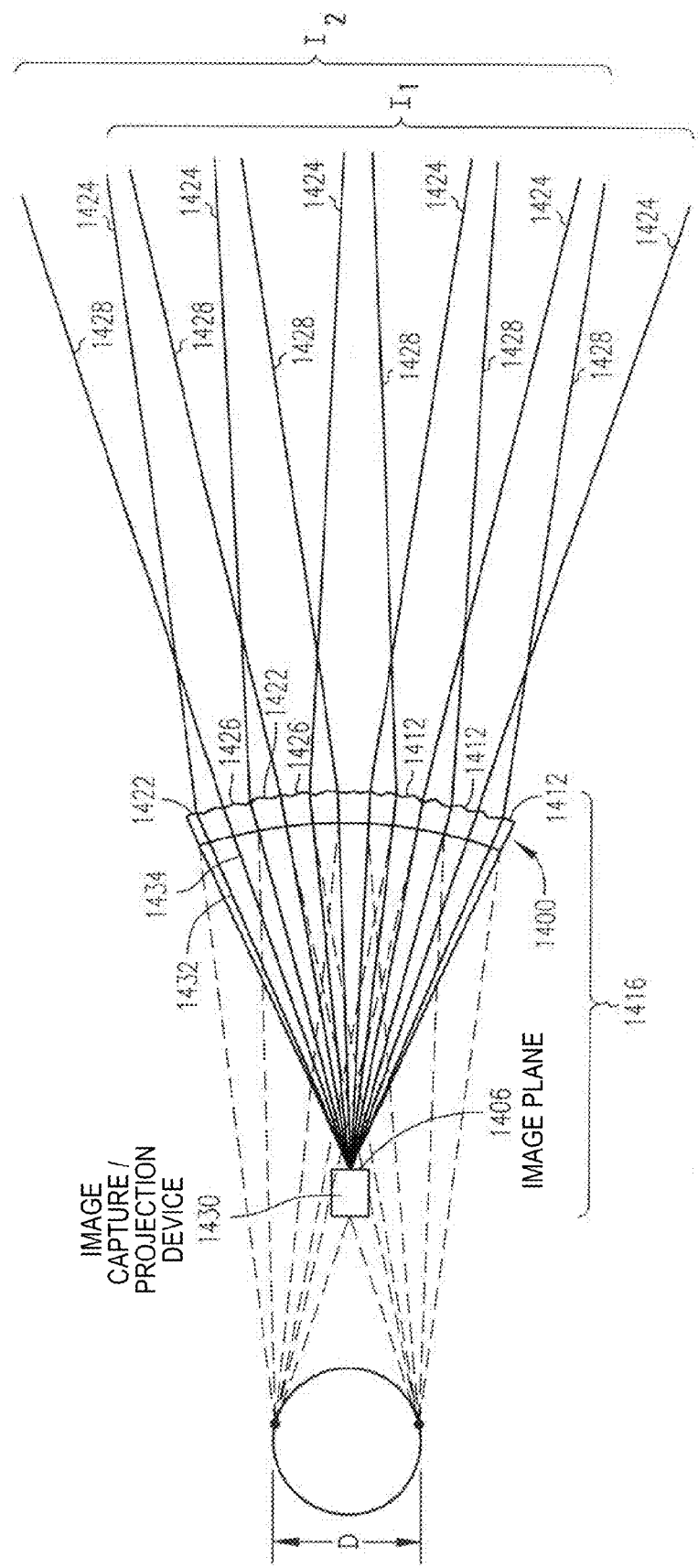
FIG. 14 is a top view of a multi-viewpoint image capture apparatus according to various embodiments.

Thus, other embodiments may be realized. For example, FIG. 14 is a top view of a multi-viewpoint image capture apparatus 1416 according to various embodiments. Thus, a lens 1400 can be provided that enables a single device to capture two or more distinct images simultaneously. For example, a single image capture device, equipped with a lens similar to that described in FIGS. 4, 10, or 13, can be placed in a room to capture a first image near a first wall, a second near another wall, and a third in between the first and second walls.

Such an image capture device is shown in FIG. 14. In this illustration, the apparatus 1416, which may be similar to the apparatus 416, is shown along with the relevant inter-ocular distance D. The apparatus 1416 may include a lens 1400 having a plurality of interleaved separating facets 1412 including a first separating facet 1422 to refract left eye rays 1424 and a second separating facet 1426 to refract right eye rays 1428. Thus, the left eye rays may be grouped as rays received from a first image, and the right eye rays may be grouped as rays received from a second image. The apparatus 1416 may also include an image acquisition plane 1406 (perhaps as part of an image capture device 1430, such as a frame-grabber, digital video camera, or some other device) to receive a refracted left eye ray 1432 from the first separating facet 1422, and to receive a refracted right eye ray 1434 from the second separating facet 1426. Additional separating facets (not shown for purposes of clarity) can be included in the lens 1400, as described with respect to the lens 1300 in FIG. 13, and additional eye rays associated with other viewpoints (e.g., the third viewpoint associated with the point of tangency $P_{t3}$ in FIG. 13) may be acquired at the image acquisition plane 1406 according to the location of the various facets on the lens 1400, and the pixels on the plane 1406.

Thus, many variations of the apparatus 1416 may be realized. For example, the apparatus 1416 may include a lens having a first plurality of interleaved separating facets including a first separating facet to refract left eye rays and a second separating facet to refract right eye rays, and an image acquisition plane to receive a first refracted left eye ray from the first separating facet, and to receive a first refracted right eye ray from the second separating facet.

The lens may include one or more additional eye ray separating facets interleaved with the first separating facet and the second separating facet. In this case, the first separating facet may correspond to a first viewpoint, the second separating facet may correspond to a second viewpoint, and one of the additional eye ray separating facets may correspond to a third viewpoint.

As noted previously, the image acquisition plane may be located at a radial distance $r_c$ from a first origin point located at the center of a first inter-ocular distance. Additional separating facets included in the lens may correspond to a second inter-ocular distance and be interleaved with the first and second separating facets. Thus, the image acquisition plane may be used to receive additional refracted eye rays from the additional separating facets.

Figure 15:
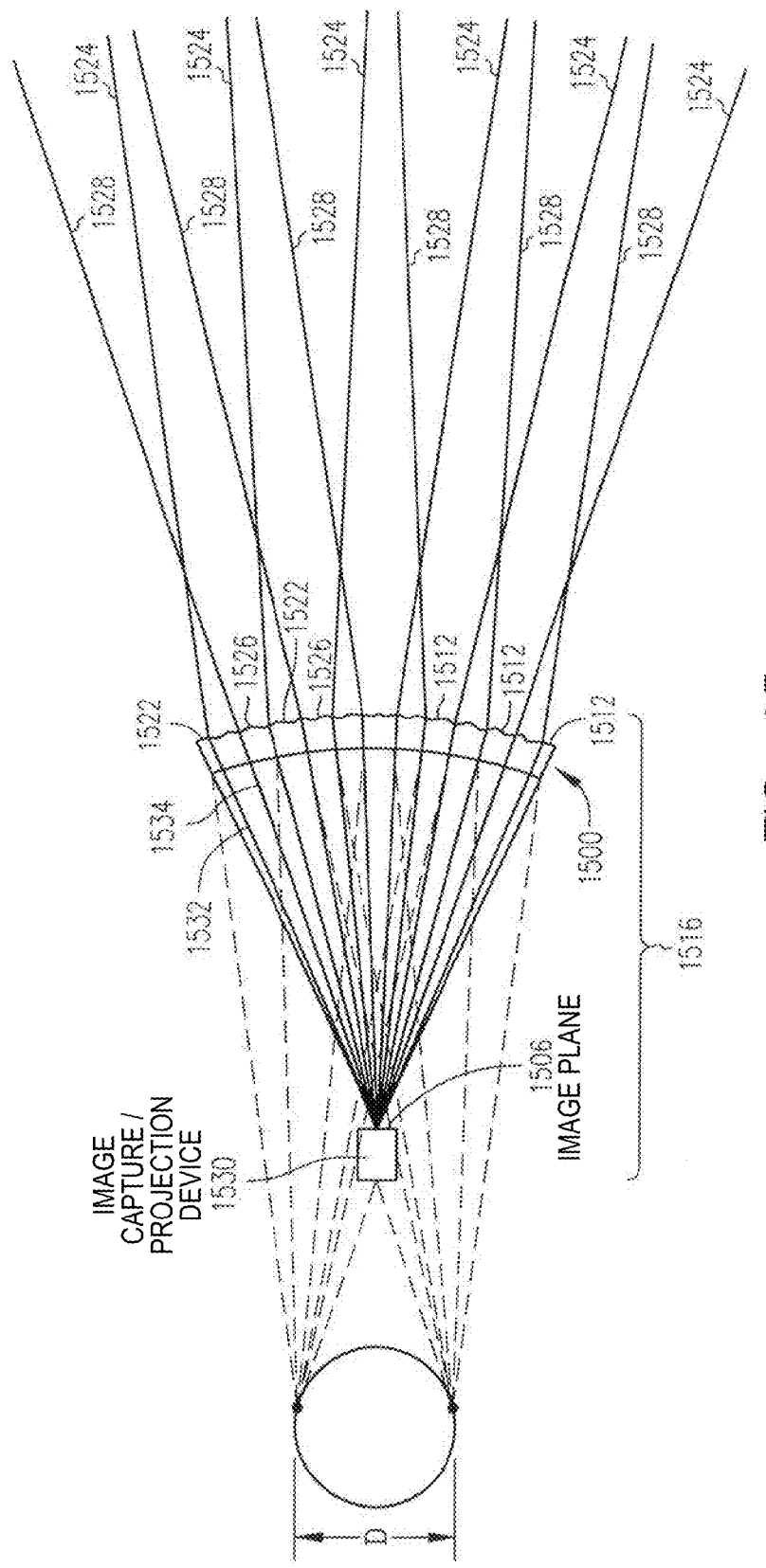
FIG. 15 is a top view of a multiple-image projection system according to various embodiments.

Yet other embodiments may be realized. For example, FIG. 15 is a top view of a multiple-image projection system 1516 according to various embodiments. Much of the prior discussion has focused on the use of lenses and image capture devices capable of capturing imagery from two or more viewpoints (e.g., $P_{t1}$, $P_{t2}$, and $P_{t3}$ in FIG. 13, and FIG. 14). This concept can be reversed and applied to the projection of images. Thus, a lens can be provided that enables a single projector to display two or more distinct video presentations simultaneously. For example, a single projector, equipped with a lens similar to that described in FIGS. 4, 10, 13, or 14 could be pointed at the corner of a room and display a first video scene on one wall, a second on another wall, and a third on a wall adjacent the first and second walls. Of course, this assumes the video presentations would be interlaced prior to projection according to the interlacing technique chosen for the projector lens (e.g., horizontal or vertical interlacing of facets).

Such a projector is shown in FIG. 15. In this illustration, apparatus 1516 may include a lens 1500 having a plurality of interleaved separating facets 1512 including a first separating facet 1522 to refract left eye rays 1524 and a second separating facet 1526 to refract right eye rays 1528. Thus, the left eye rays may be grouped to form a first projected image $I_1$, and the right eye rays may be grouped to form a second projected image $I_2$.

The apparatus 1516 may also include an image projection plane 1506 (perhaps as part of an image projection device 1530, such as a digital video projector, or some similar device) to transmit a refracted left eye ray 1532 to the first separating facet 1522, and to transmit a refracted right eye ray 1534 to the second separating facet 1526. Additional separating facets (not shown for purposes of clarity) can be included in the lens 1500, as described with respect to the lens 1300 in FIG. 13, and additional eye rays associated with a third viewpoint (e.g., $P_{t3}$ in FIG. 13).

The image projection plane 1506 may be located at a radial distance $r_c$ from an origin point located at a center of a first inter-ocular distance (e.g., $D_1$ in FIG. 13), which may comprise a distance of approximately 4 centimeters to approximately 8 centimeters. The lens 1500 may include one or more additional eye ray separating facets (not shown for clarity, but perhaps interleaved with the first separating facet 1522 and the second separating facet 1526), wherein the first separating facet corresponds to a first viewpoint, wherein the second separating facet corresponds to a second viewpoint, and wherein the additional eye ray separating facet corresponds to a third viewpoint and a second inter-ocular distance (e.g., $D_2$ in FIG. 13).

Figure 16A:
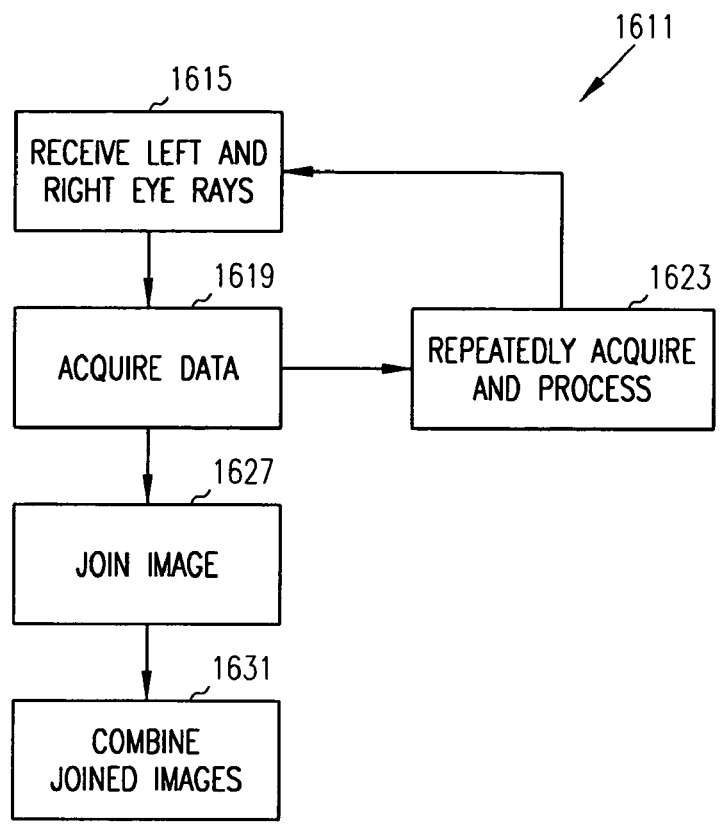
FIGS. 16A and 16B are flow charts illustrating several methods according to various embodiments.
Figure 16B:
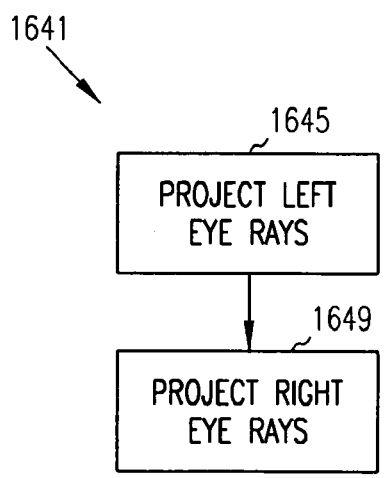

Still further embodiments may be realized. For example, FIGS. 16A and 16B are flow charts illustrating several methods according to various embodiments. Some of the methods to be described may be derived from the process illustrated in FIG. 7. Thus, in some embodiments of the invention, a method 1611 may (optionally) begin at block 1615 with receiving a plurality of left eye rays through one of a first plurality of separating facets of a lens at an image acquisition plane, and receiving a plurality of right eye rays through one of a second plurality of separating facets of the lens at the image acquisition plane. The first plurality of separating facets may be interleaved with the second plurality of separating facets, as shown in FIG. 4.

The method 1611 may continue with acquiring data from the image acquisition plane to construct a separated left eye image, and acquiring data from the image acquisition plane to construct a separated right eye image at block 1619. The method 1611 may further include joining the separated left eye image to provide a joined left eye image, and joining the separated right eye image to provide a joined right eye image at block 1627, as well as combining the joined left eye image and the joined right eye image to provide a stereoscopic image at block 1627. The method may also include combining the joined left eye image and the joined right eye image to provide a 360 degree (or some lesser amount of degrees), panoramic stereoscopic image at block 1631. As noted previously, an outer radius of the lens may correspond to a distance at which a field of view of the image acquisition plane overlaps a field of view of the lens.

The method 1611 may also include repeatedly acquiring data from the image acquisition plane to construct a separated left eye image, repeatedly acquiring data from the image acquisition plane to construct a separated right eye image, and processing the separated left eye image and the separated right eye image to provide a moving stereoscopic image at block 1623. The method 1611 may further include repeatedly acquiring data from the image acquisition plane to construct a separated left eye image, repeatedly acquiring data from the image acquisition plane to construct a separated right eye image, and processing the separated left eye image and the separated right eye image to provide a moving 360 degree (or some lesser number of degrees), panoramic stereoscopic image at block 1623.

Still further embodiments may be realized. For example, a method of projecting multiple images is illustrated in FIG. 16B. Thus, a method 1641 may include projecting a plurality of left eye rays through one of a first plurality of separating facets of a lens from an image projection plane at block 1645. The method 1641 may also include projecting a plurality of right eye rays through one of a second plurality of separating facets of the lens from the image projection plane at block 1649. The first plurality of separating facets may be interleaved with the second plurality of separating facets, and the plurality of left eye rays may comprise a portion of a separated left eye image, while the plurality of right eye rays may comprise a portion of a separated right eye image. As described previously with respect to an image capture plane, the outer radius of the lens may correspond to a distance at which the field of view of the image projection plane overlaps the field of view of the lens.

It should be noted that the methods described herein do not have to be executed in the order described, or in any particular order. Moreover, various activities described with respect to the methods identified herein can be executed in repetitive, iterative, serial, or parallel fashion. For the purposes of this document, the terms "information" and "data" may be used interchangeably. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java, Smalltalk, or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment, including Hypertext Markup Language (HTML) and Extensible Markup Language (XML). Thus, other embodiments may be realized.

Figure 17:
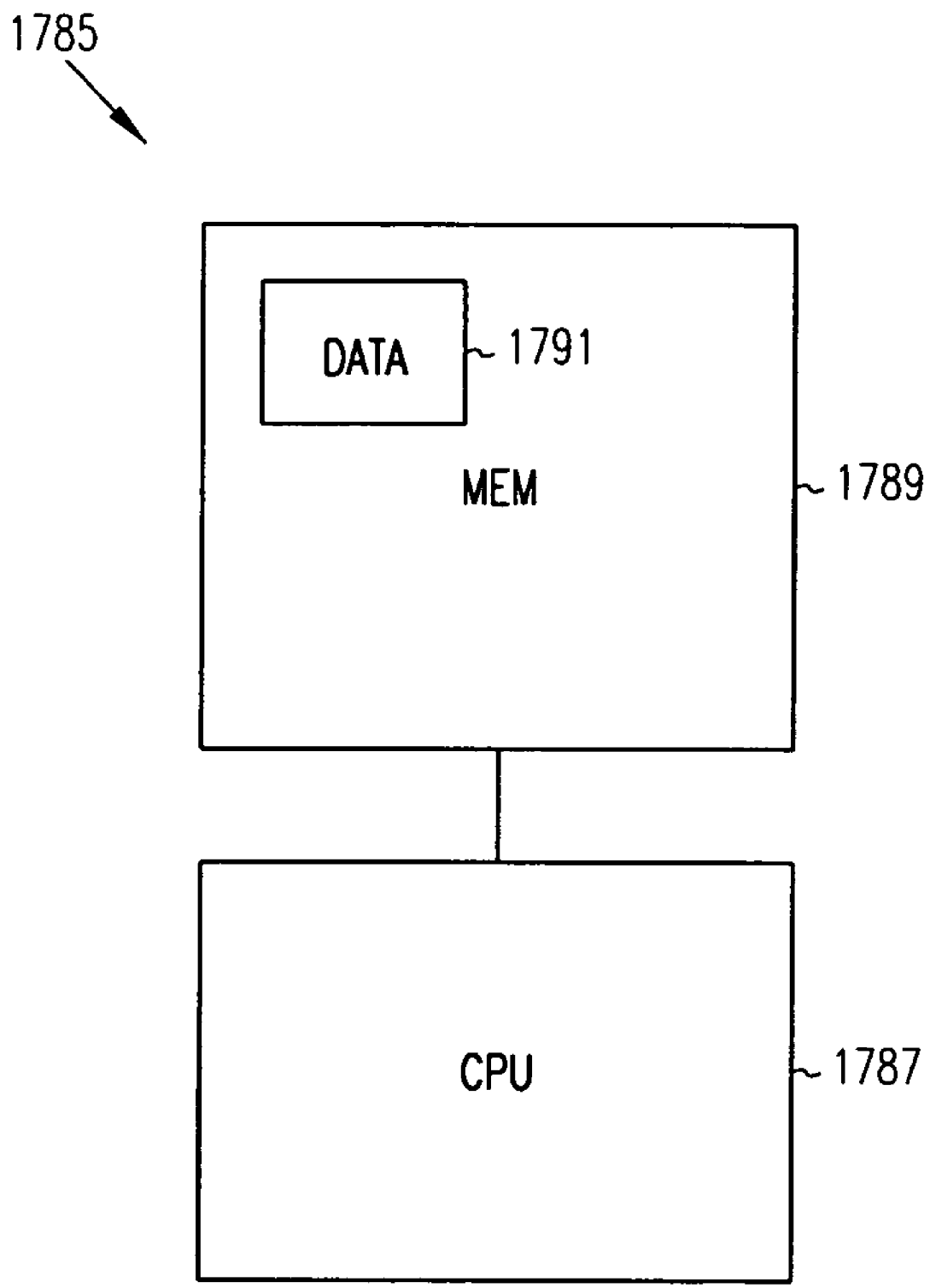
FIG. 17 is a block diagram of several articles according to various embodiments.

FIG. 17 is a block diagram of an article 1785 according to various embodiments, such as a computer, a memory system, a magnetic or optical disk, some other storage device, and/or any type of electronic device or system. The article 1785 may comprise a processor 1787 coupled to a machine-accessible medium such as a memory 1789 (e.g., a memory including an electrical, optical, or electromagnetic conductor) having associated information 1791 (e.g., computer program instructions or other data), which when accessed, results in a machine (e.g., the processor 1787) performing such actions as receiving a plurality of left eye rays through one of a first plurality of separating facets of a lens at an image acquisition plane, and receiving a plurality of right eye rays through one of a second plurality of separating facets of the lens at the image acquisition plane.

Other actions may include acquiring data from the image acquisition plane to construct a separated left eye image, and acquiring data from the image acquisition plane to construct a separated right eye image. Further activity may include joining the separated left eye image to provide a joined left eye image, and joining the separated right eye image to provide a joined right eye image, as well as combining the joined left eye image and the joined right eye image to provide a stereoscopic image.

Still further activities may include projecting a plurality of left eye rays through one of a first plurality of separating facets of a lens from an image projection plane, and projecting a plurality of right eye rays through one of a second plurality of separating facets of the lens from the image projection plane. As noted previously, the plurality of left eye rays may comprise a portion of a separated left eye image, and the plurality of right eye rays may comprise a portion of a separated right eye image.

According to the physical properties of refraction, a light ray incident upon a refractive surface, the resulting refracted ray through the surface, and the refractive surface's normal ray (e.g., a vector perpendicular to the surface) are typically coplanar. This may be true regardless of the three-dimensional orientation of the rays, and thus, the previously discussed two-dimensional lens formulation concepts can be applied within a three-dimensional space.

For example, translating the lens formulation design from a two-dimensional coordinate system to three-dimensional space can be implemented using a three-dimensional (e.g., x,y,z) vector representation, such as designating the incident ray as vector I, the refracted ray as vector R, and the lens surface normal as vector N. The vector-based coplanar lens 1100 corresponding to a left eye facet, as previously seen in FIG. 11, is illustrated as the lens 1800 in FIG. 18. The incident ray $I_c$ at any given lens point $P_i$ may be determined based on the properties of the image capture device, as discussed previously. The refracted ray $R_{LE}$ or $R_{RE}$ (e.g., as seen in FIGS. 11 and 12) at any given lens point $P_i$ may be determined based on the properties of the desired stereoscopic panoramic image projection, as discussed previously. Once the incident ray $I_c$ and the desired refracted ray $R_{LE}$ or $R_{RE}$ have been determined, the lens surface normal vector $N_{LS}$ or $N_{RS}$ to achieve the desired refraction can be calculated as shown in Table I:

TABLE I

| $N_{LS}$ | $N_{RS}$ |
|---|---|
| $\Theta_{LSN} = \arctan\left(\dfrac{\sqrt{1-(I_c \cdot R_{LE})^2}}{n-(I_c \cdot R_{LE})}\right)$ | $\Theta_{RSN} = \arctan\left(\dfrac{\sqrt{1-(I_c \cdot R_{RE})^2}}{n-(I_c \cdot R_{RE})}\right)$ |
| Set $N_{LS} = I_c$ | Set $N_{RS} = I_c$ |

$\Theta_{LSN}$ and $\Theta_{RSN}$ are angles residing in the same plane that includes vectors I, R, and N. If I and R are coplanar, then (I×R) is a vector normal to the plane including I and R, and includes point $P_i$. Thus, in this case, the refraction angles $\Theta_{LSN}$ and $\Theta_{RSN}$ are in the plane that includes I and R, instead of in the X-Y coordinate system plane. Since (I×R) comprises a vector normal to the plane in which I, R, and N reside, $N_{LS}$ may be rotated by a specified amount (e.g., by $\Theta_{LSN}$) around the ray ($I_c \times R_{LE}$) at the intersection point $P_i$, between I and R. Similarly, $N_{RS}$ may be rotated by a specified amount (e.g., by $\Theta_{RSN}$) around the ray ($I_c \times R_{RE}$).

The calculated lens surface normal vector (e.g., $N_{LS}$ or $N_{RS}$), along with a lens surface point ($P_i$), may operate to describe an infinite plane within three-dimensional space. This plane can then be clipped as appropriate to define a single refracting lens facet. Using this three-dimensional lens formulation allows the resulting lens to more accurately match the viewing projection for the associated image capture device, or projector, regardless of its format or orientation.

It should be noted that most of the examples given below illustrate different methods for generating lens surfaces and facets that operate from a left eye point of view. This has been done in the interest of brevity, avoiding excessive repetition of concepts that may be mirrored in drawings and formulae so as to be adapted to a right eye viewpoint. Thus, the numerous embodiments illustrated are not to be so limited. That is, all of the techniques and mechanisms discussed herein apply equally to facets and lenses using left eye or right eye viewpoints.

Figure 18:
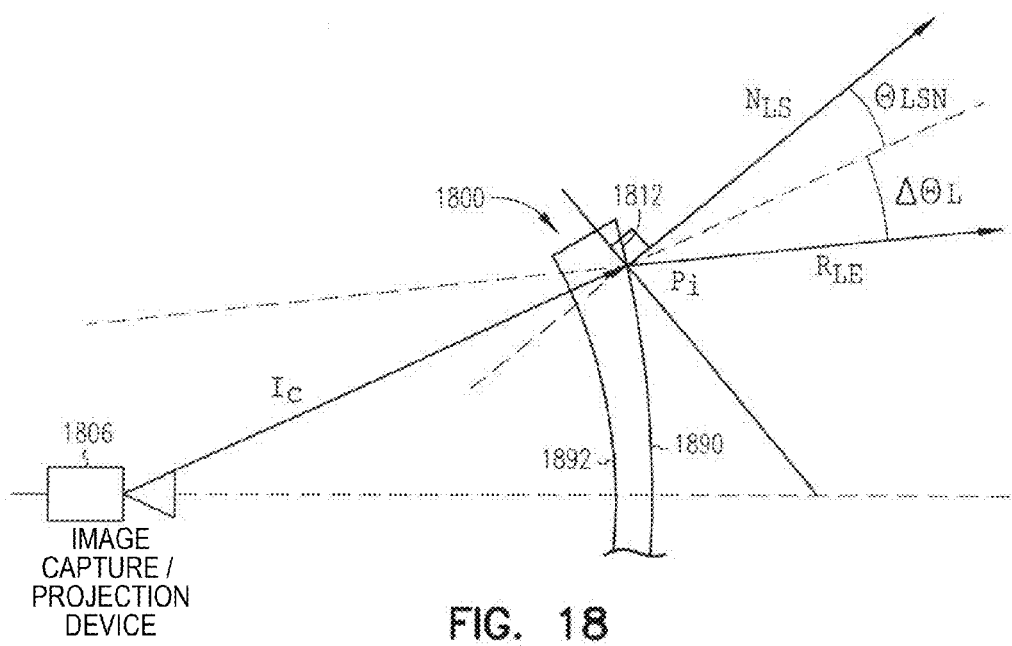
FIG. 18 is a top view of lens facet orientation angles relating to a lens and image capture plane according to various embodiments.

FIG. 18 is a top view of lens facet orientation angles relating to a lens and image capture plane according to various embodiments. Thus, by referring to FIGS. 11, 12, and 18, it can be seen that many other embodiments may be realized. For example, some embodiments may include a method comprising receiving a plurality of left eye rays through one of a first plurality of separating facets of a lens at an image acquisition plane and receiving a plurality of right eye rays through one of a second plurality of separating facets of the lens at the image acquisition plane. One or more facets 1812 of the first plurality of separating facets may have a surface normal vector $N_{S1}$ determined by a surface normal angle $\Theta_{SN1}$ included between the surface normal vector $N_{S1}$ and an incident vector $I_{c1}$, perhaps intersecting at a point ($P_i$) including a cross product vector comprising a cross product of the incident vector $I_{c1}$ and a refracting vector $R_1$.

The surface normal angle $\Theta_{SN1}$ may be approximately equal to arctan $$\left(\dfrac{\sqrt{1-(I_{c1} \cdot R_1)^2}}{\dfrac{n_1}{n_2}-(I_{c1} \cdot R_1)}\right),$$

when the vectors $N_{S1}$, $R_1$, and $I_{c1}$ are included in a common plane. The incident vector $I_{c1}$ may comprise a ray incident to the facet 1812 and passing through a first viewpoint (e.g., PLE of FIG. 11). The refracting vector $R_1$ may comprise a ray to be refracted by the facet 1812. $n_1$ may comprise an index of refraction corresponding to the incident vector $I_{c1}$, and $n_2$ may comprise an index of refraction corresponding to the refracting vector $R_1$. The surface normal vector $N_{S1}$ may be rotated around the cross product vector by the surface normal angle $\Theta_{SN1}$ in the common plane.

In some embodiments, the method may include acquiring data from the image acquisition plane 1806 to construct a separated eye image. As noted previously, the separated eye image may be selected from a separated left eye image and a separated right eye image. The separated eye image may be joined to provide a joined eye image, which in turn may be selected from a joined right eye image and a joined left eye image. The joined left eye image and the joined right eye image may be combined to form a stereoscopic image, a panoramic stereoscopic image, and/or a substantially spherical stereoscopic image.

Activities may be repeated to capture a series of moving images, perhaps for projected viewing at a later time. For example, in some embodiments, a method may include repeatedly acquiring data from the image acquisition plane to construct a plurality of separated left eye images, repeatedly acquiring data from the image acquisition plane to construct a plurality of separated right eye images, and processing the plurality of separated left eye images and the plurality of separated right eye images to provide a moving stereoscopic image, a moving panoramic stereoscopic image, and/or a moving substantially spherical stereoscopic image.

Other embodiments may be realized. For example, a method of projecting an image may include accessing a plurality of separated left eye images, accessing a plurality of separated right eye images, processing the plurality of separated left eye images and the plurality of separated right eye images to project a first portion of a moving stereoscopic image through a lens having at least one facet including a surface normal vector $N_{S1}$ determined as described previously. The moving stereoscopic image may comprise a panoramic stereoscopic moving image, and/or a substantially spherical stereoscopic moving image.

Thus, in some embodiments, the method may include processing the plurality of separated left eye images and the plurality of separated right eye images to project a second portion of a moving stereoscopic image through the lens having another facet with a surface normal vector $N_{S2}$ determined by a surface normal angle $\Theta_{SN2}$ included between the surface normal vector $N_{S2}$ and an incident vector $I_{c2}$ to intersect at a point including a cross product vector comprising a cross product of the incident vector $I_{c2}$ and a refracting vector $R_2$. The surface normal angle $\Theta_{SN2}$ may be approximately equal to arctan $$\left( \frac{\sqrt{1-(I_{c2} \cdot R_2)^2}}{\frac{n_3}{n_4}-(I_{c2} \cdot R_2)} \right),$$

when the vectors $N_{S2}$, $R_2$, and $I_{c2}$ are included in the common plane. The incident vector $I_{c2}$ may comprise a ray incident to the other facet and passing through a second viewpoint (e.g., a right-eye viewpoint) different than the first viewpoint (e.g., a left-eye viewpoint). The refracting vector $R_2$ may comprise a ray refracted by the other facet, wherein $n_3$ comprises an index of refraction corresponding to the incident vector $I_{c2}$ and $n_4$ comprises an index of refraction corresponding to the refracting vector $R_2$. The surface normal vector $N_{S2}$ may be rotated around the cross product vector by the surface normal angle $\Theta_{SN2}$ in the common plane.

Some embodiments may also include articles. For example, an article may comprise a machine-accessible medium having associated information, wherein the information, when accessed, results in a machine performing such activities as receiving a plurality of left eye rays through one of a first plurality of separating facets of a lens at an image acquisition plane, and receiving a plurality of right eye rays through one of a second plurality of separating facets of the lens at the image acquisition plane, wherein at least one facet of the first plurality of separating facets has a surface normal vector $N_{S1}$ determined as described previously. One or more separated eye images may be constructed by acquiring data from the image acquisition plane, and the separated eye image(s) may be selected from separated left eye image(s) and separated right eye image(s). Separated left eye images may be joined to provide joined left eye images, separated right eye images may be joined to provide joined right eye images, and the joined left and right eye images may be combined to provide a stereoscopic image.

In many cases, it is sufficient to generate a lens surface that performs the desired refraction at the external surface 1890. However, in some cases it may be desirable to generate a lens that performs the desired refraction at the internal surface 1892. Adusting the formulas above will accommodate this change. For example, such adjustments may be useful when the internal surface 1892 alone is desired for the location of facets 1812, since the internal surface may be less prone to chipping and other kinds of damage, and cleaning a smooth external surface may be easier to accomplish. In addition, in some instances, the orientation of certain facets can cause undesired refraction. Sometimes the refraction angles can be so extreme that a single ray can't pass through the lens at a specified point without intersecting an adjacent facet, interfering with the intended trajectory. Different surface boundaries (e.g., glass to air, and air to glass) can produce different facet operational properties, which in some cases may eliminate, or exacerbate, these types of dual intersection problems.

Thus, if we replace the index of refraction (n) in the above formulas with the ratio of the index of refraction of the incident ray's medium ($n_1$) to the index of refraction of the refracted ray's medium ($n_2$), then the formulas given may apply to any arbitrary refractive surface interaction.

$$\Theta_{LSN} = \arctan\left( \frac{\sqrt{1-(I_c \cdot R_{LE})^2}}{\frac{n_1}{n_2}-(I_c \cdot R_{LE})} \right)$$

$$\Theta_{RSN} = \arctan\left( \frac{\sqrt{1-(I_c \cdot R_{RE})^2}}{\frac{n_1}{n_2}-(I_c \cdot R_{RE})} \right)$$

Figure 19:
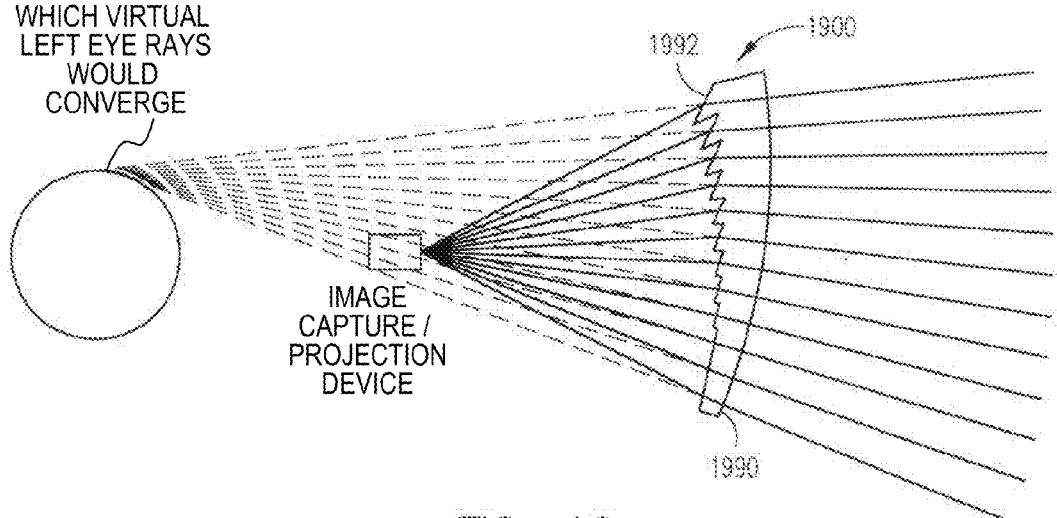
FIG. 19 is a top view of a lens refracting left eye rays according to various embodiments.

FIG. 19 is a top view of a lens refracting left eye rays according to various embodiments. The formulas can be used to generate lens surface normal data describing a lens that performs the desired refraction on the internal lens surface. In order to maintain the desired refraction, the external surface of the lens should ideally not alter the outbound ray direction. To achieve this, at each interaction point, the external lens surface should be perpendicular to the refracted ray. An example of such refraction, using only the internal surface 1992 of the lens 1900, as opposed to the external surface 1990 of the lens, is shown in FIG. 19.

Figure 20A:
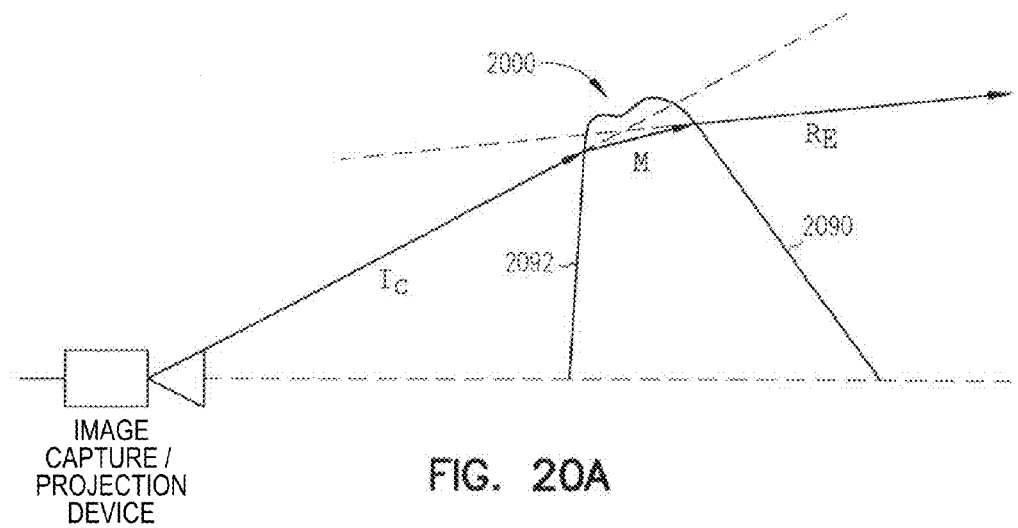
FIGS. 20A and 20B are a top view of lens facet orientation angles relating to a lens, and an apparatus, respectively, according to various embodiments.
Figure 20B:
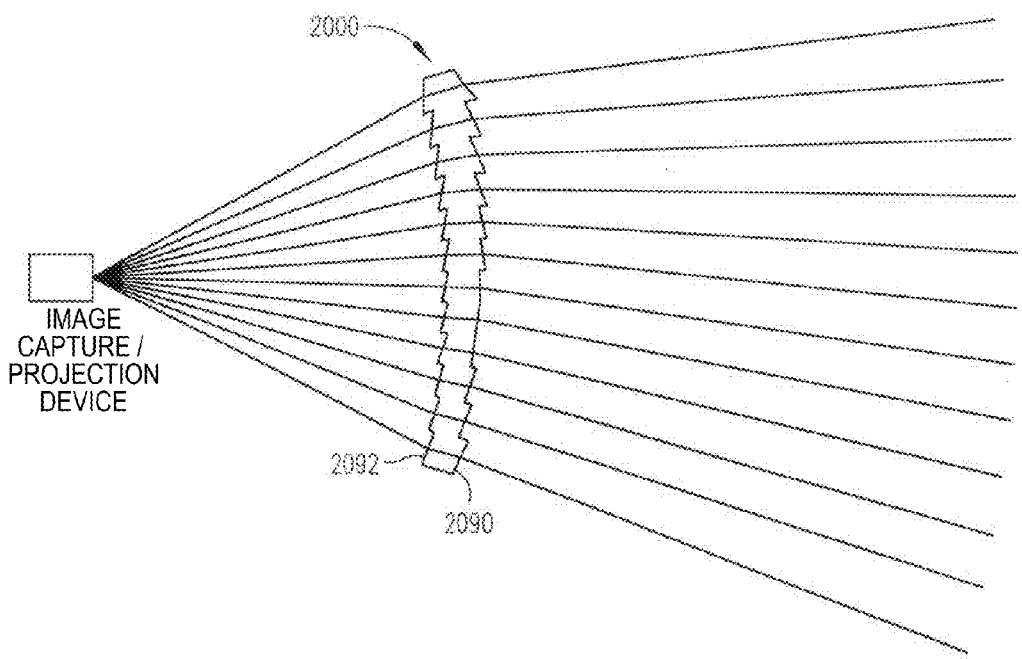

FIGS. 20A and 20B are a top view of lens facet orientation angles relating to a lens, and an apparatus, respectively, according to various embodiments. Thus it can be seen that further variations are possible. For example, the formulas can also be used to generate lenses that perform the desired refraction using a combination of internal and external lens surface refraction. See FIGS. 20A and 20B.

This may be achieved by defining a desired intermediate ray M that has a pointing direction that lies somewhere between the camera ray $I_c$ and the desired eye ray $R_E$. The intermediate ray M can be used in the formulas so as to take the place of the refracted eye ray when generating the internal lens surface 2092, and in place of the incident camera ray when generating the external lens surface 2090. Thus, a lens 2000 may be designed that splits its refraction substantially equally between the internal and external lens surfaces. In this manner, the arbitrary division of refraction between internal and external lens surfaces is possible.

Figure 21A:
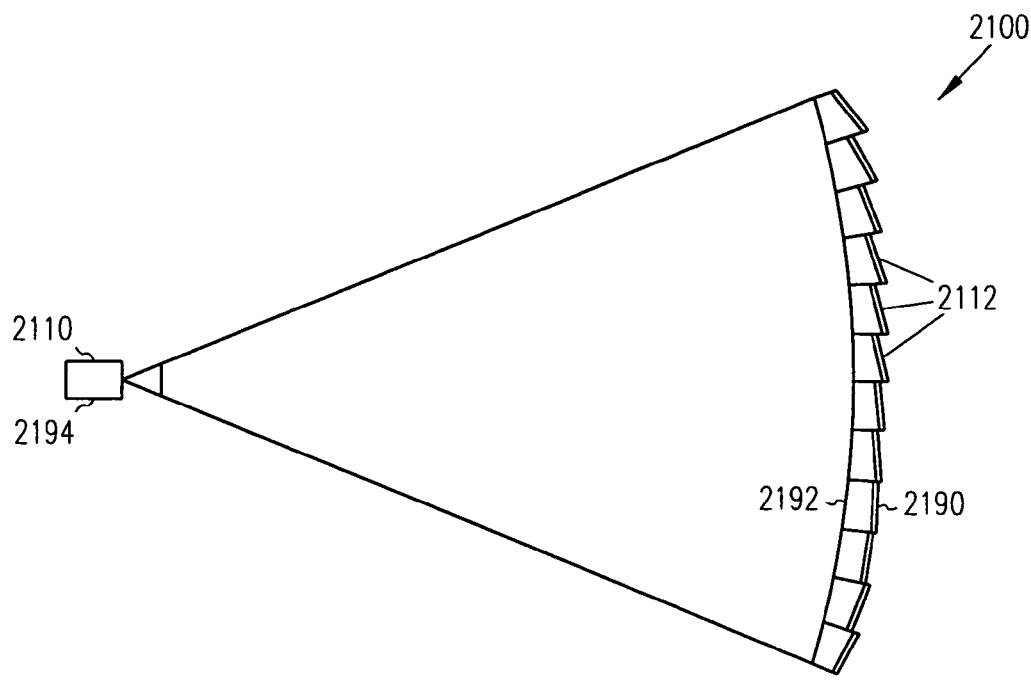
FIGS. 21A and 21B are top and perspective views of a lens and image capture/projection apparatus according to various embodiments.
Figure 21B:
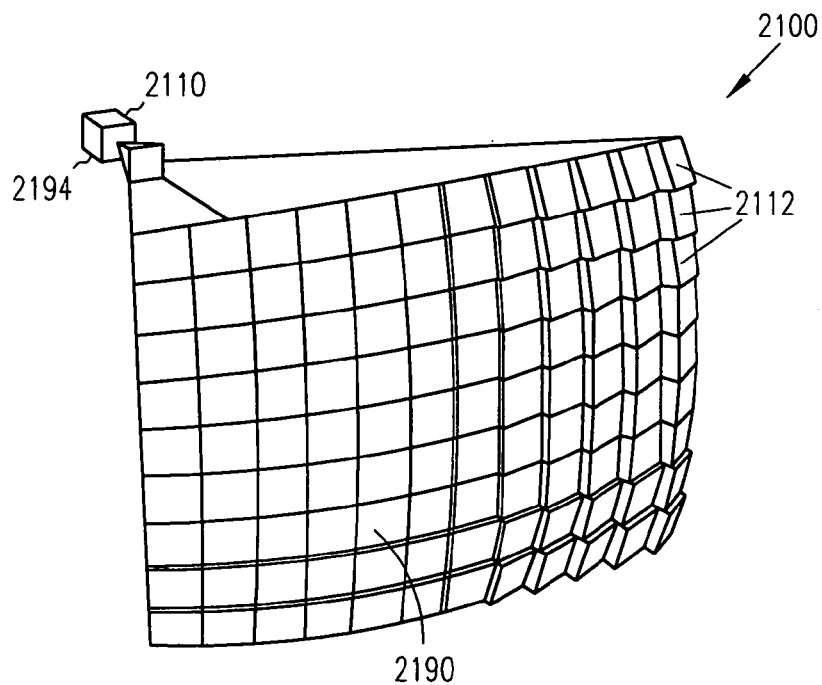

FIGS. 21A and 21B are top and perspective views of a lens and image capture/projection apparatus according to various embodiments. Thus, it can be seen that there are many different ways to use calculated surface normal information to generate a lens. For example, the lens 2100 surface (e.g., the exterior surface 2190 as shown, or the interior surface 2192) can be constructed of a series of individually calculated facets 2112. Each lens facet 2112 may correspond to a group of pixel positions on an associated image capture device 2110, or even a projector 2194. The resulting image quality may improve as the pixel grouping (e.g., the number of pixels) associated with a single lens facet shrinks. Utilizing the three-dimensional lens formulation, rather than an extrusion of the two-dimensional formulation, permits the overall lens shape to more accurately match that of the viewing projection of the image capture device 2110 (or a projector 2194). However, the use of discrete lens facets 2112 may result in a jagged lens surface 2190, 2192.

The number of vertical and horizontal rows of facets 2112, and facet 2112 dimensions may be arbitrarily selected. However, various properties of the image capture device 2110 or projector 2194 (e.g., number of pixels in the vertical and horizontal directions) may be used to select the particular construction of the lens 2100. For example, one facet 2112 may be assigned to one pixel on the image capture device 2110.

In some embodiments, for each pixel position at the image capture device 2110 or projector 2194, the camera ray will be known based on field of view and sensor properties. The surface intersection point may then be calculated, the ray from that intersection point to the eye viewpoint may be calculated, and the corresponding refraction surface may be determined.

Figure 22A:
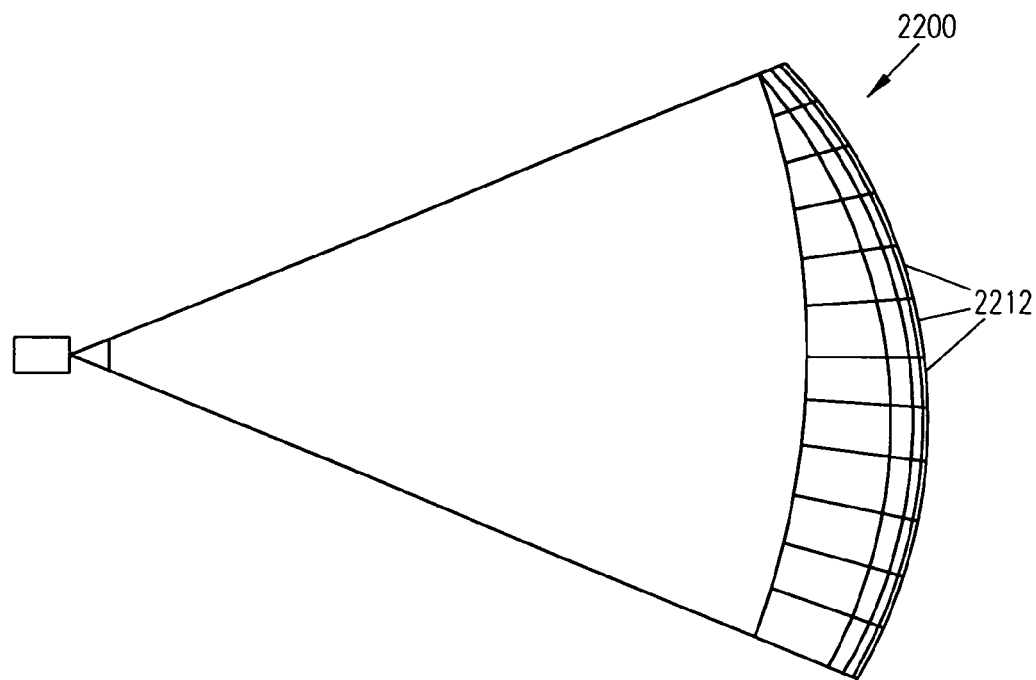
FIGS. 22A and 22B are top and perspective views of a lens and image capture/projection apparatus according to various embodiments.
Figure 22B:
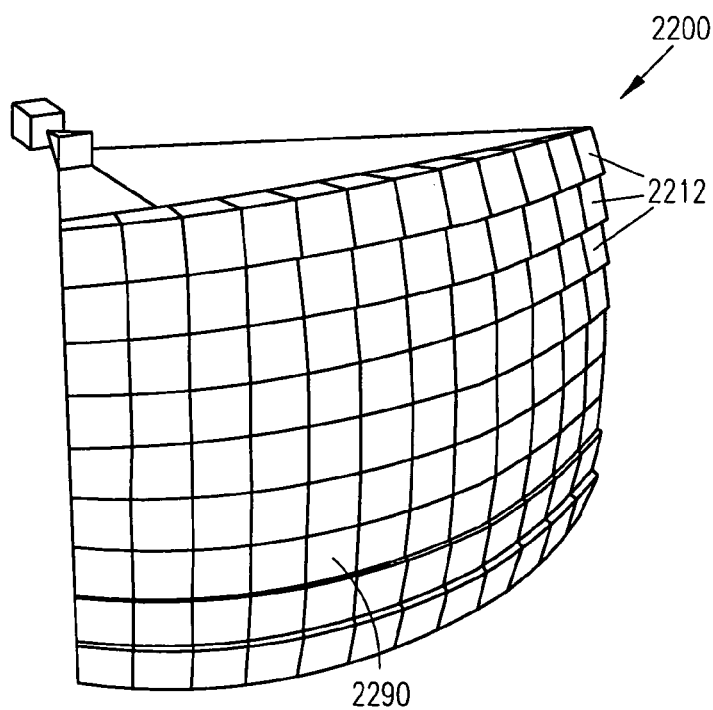

FIGS. 22A and 22B are top and perspective views of a lens and image capture/projection apparatus according to various embodiments. To smooth jagged lens surfaces that may result from implementing previously described methods, lens facets can be generated using additional spatial constraints. For example, individual lens facet properties, such as the surface normal, may be calculated according to the previously discussed formulas, with the facets 2212 placed in space such that adjacent facet edges touch, as illustrated in the lens 2200. While an asymmetrical lens surface 2290 may result, a large number of the jagged edges may be eliminated.

Such results can be achieved because the surface of a facet 2212 may be moved along the path of the ray approaching it, while its orientation remains the same (with respect to the surface normal). Increasing facet thickness may occur, due to progressively shifting facets 2212 in space to more closely align with adjacent facets 2212. Thus, as one facet 2212 is moved in this manner until one of its corners matches that of an adjacent facet 2212, there may still be other facet corners that don't precisely line up (because the spatial orientation/surface normals of individual facets 2212 don't lie in the same direction).

Figure 23A:
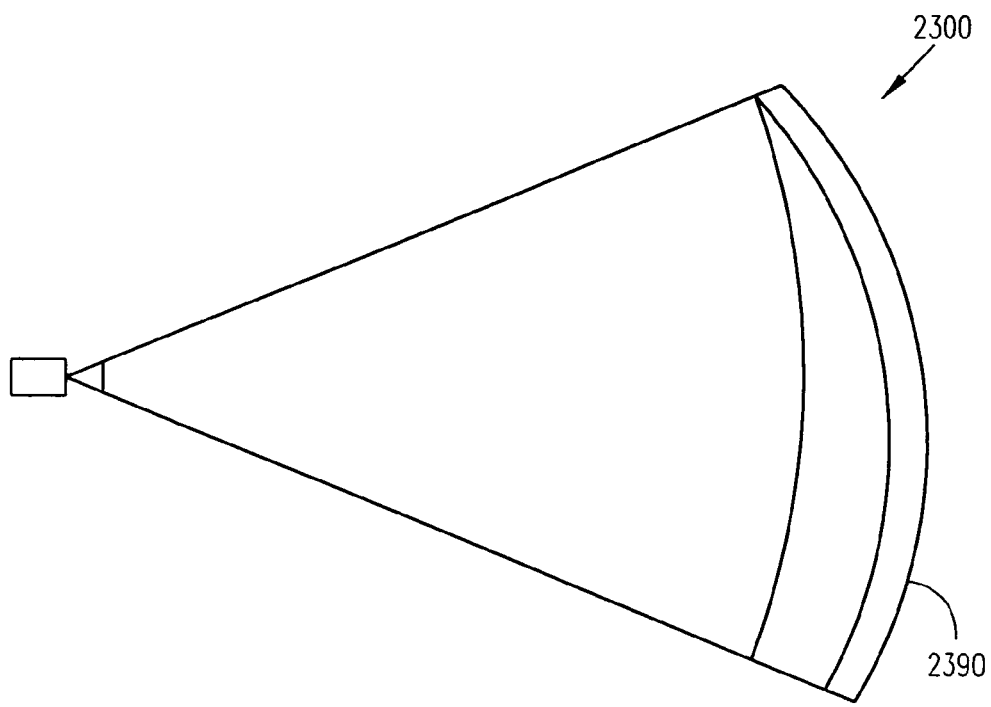
FIGS. 23A and 23B are top and perspective views of a lens and image capture/projection apparatus according to various embodiments.
Figure 23B:
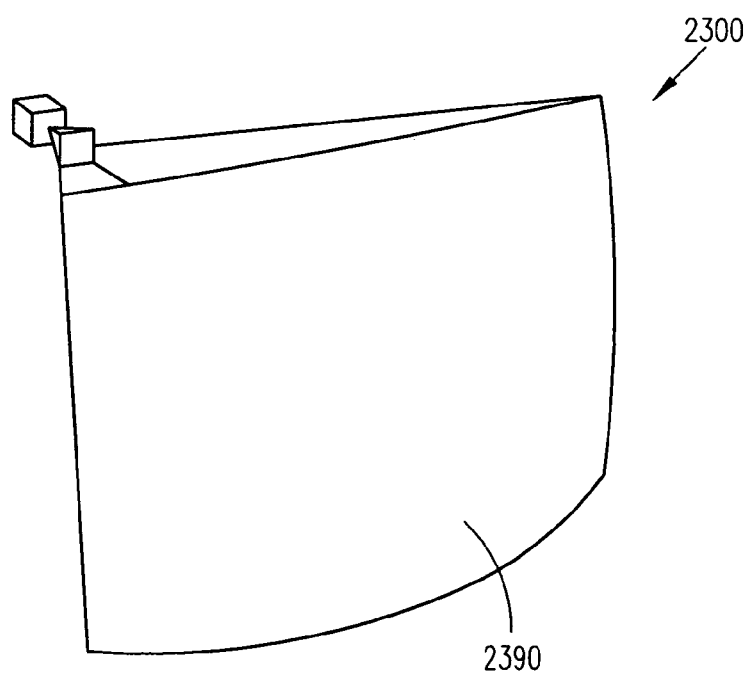

FIGS. 23A and 23B are top and perspective views of a lens and image capture/projection apparatus according to various embodiments. In some cases, a fairly smooth lens surface may be approximated using these techniques. While the smoothed surface 2390 of the lens 2300 may closely approximate desired refraction properties, some loss of precision may be experienced on a pixel by pixel basis. Spatial normalization of the lens facets may lower manufacturing costs, as well as reducing unwanted optical interactions between adjacent lens facets.

Considering the previously discussed techniques for generating the surfaces of left and right eye lenses individually, it may be understood that there are several ways to combine the resulting lenses to form stereoscopic lenses. For example, since the various lens generation processes may effectively produce an array of refracting facets, each of which corresponds to a region of pixels in an associated image capture device or projector, it follows that subsections of a left eye lens can be interspersed with subsections of a right eye lens to produce a single stereoscopic lens.

The subsections of a stereoscopic lens dedicated to individual eye lenses can be chosen in several ways. For example, there may be a 1:1, 1:2, 1:4, etc. correspondence between individual lens facets and some number of pixels on the image capture device or a projection plane. The result is that multiple rays may pass through each facet. Each ray may be bent in a slightly different fashion from others passing through the same lens facet because the incoming ray direction is also slightly different. In a projector embodiment, for example, four different pixels per facet may be projected, but the resulting refractive precision decreases (e.g., only one of these four may be refracted as desired).

Figure 24A:
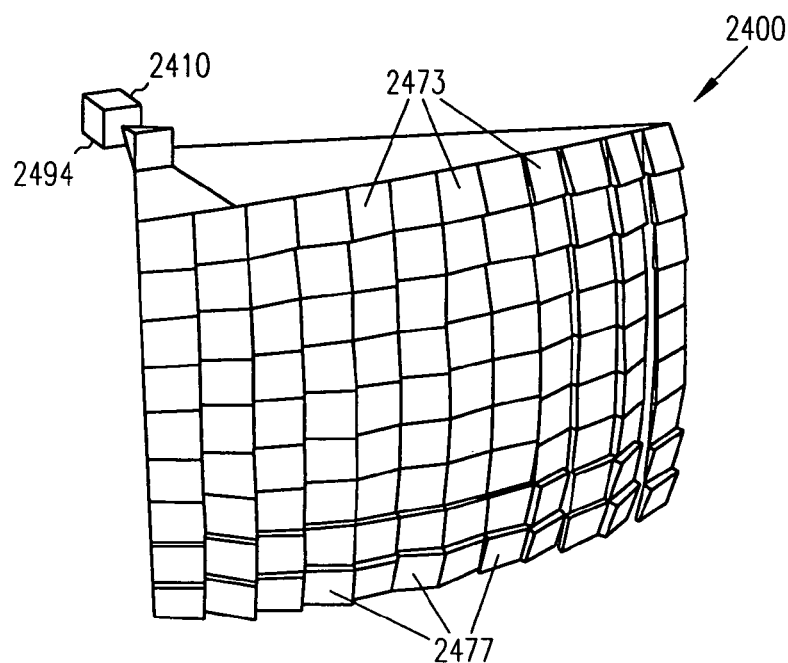
FIGS. 24A-24D are perspective views of a lens having interlaced strips corresponding to right and left eye viewpoints according to various embodiments.
Figure 24B:
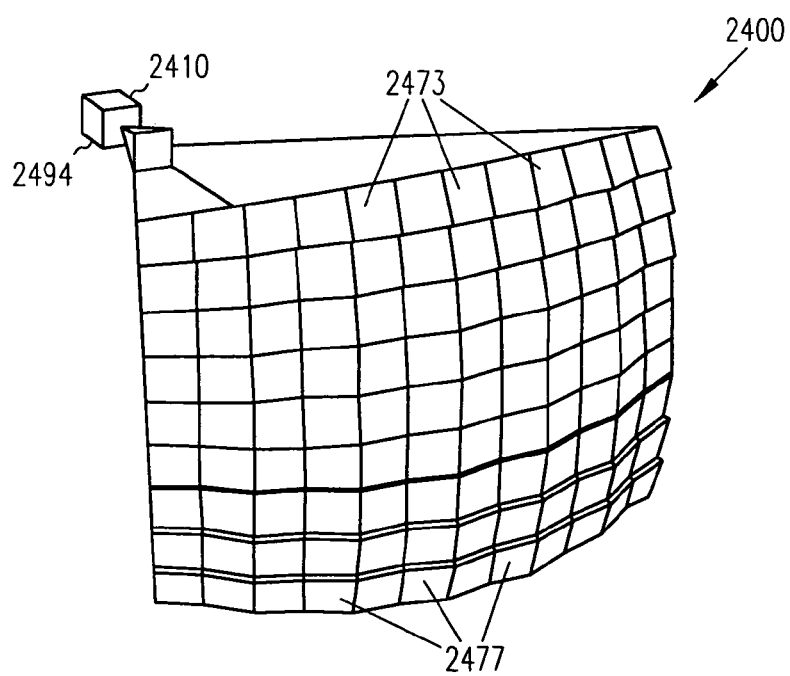
Figure 24C:
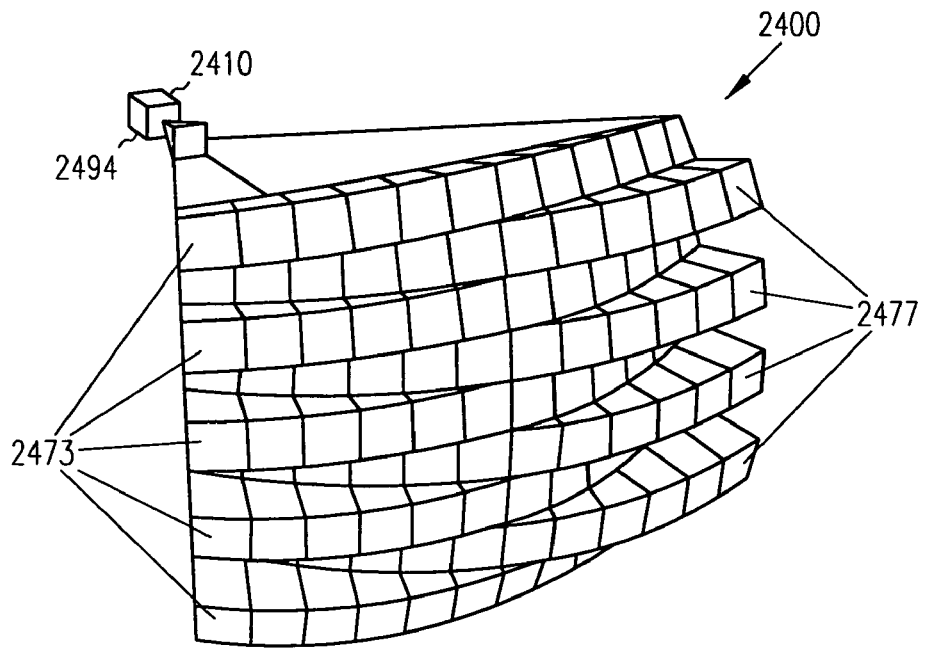
Figure 24D:
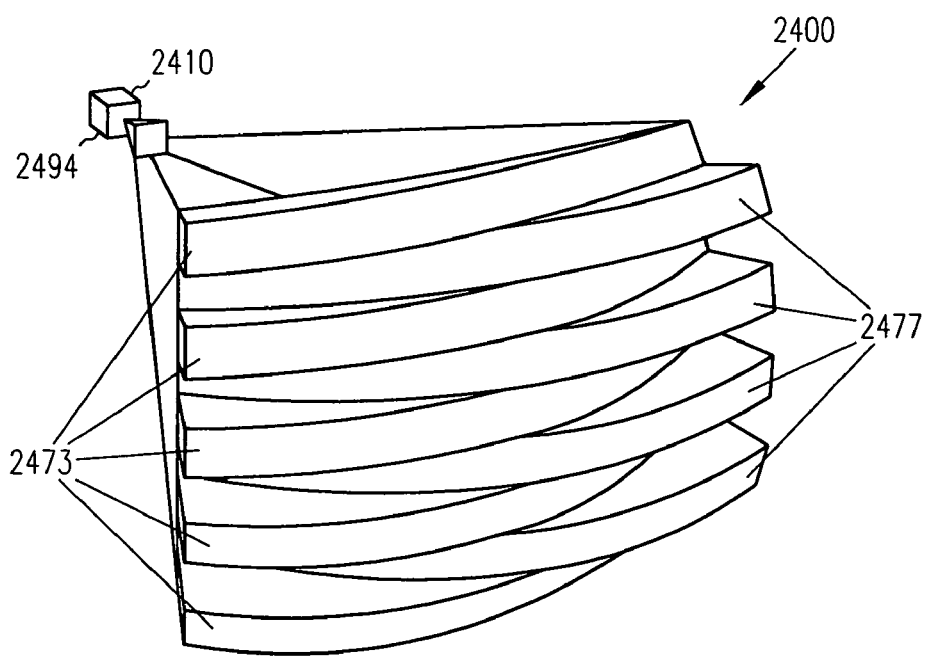

FIGS. 24A-24D are perspective views of a lens having interlaced strips corresponding to right and left eye viewpoints according to various embodiments. In some embodiments, the left eye and right eye lenses can be combined in discrete lens strips (e.g., left eye strips 2473 and right eye strips 2477) that correspond to the coordinate space of the associated image capture device 2410 or projector 2494. For a conventional rectangular image capture device, it is most convenient to alternate left eye and right eye lens strips 2473, 2477 such that the resulting imagery, captured by the image capture device 2410, contains data from alternating left eye and right eye image strips 2473, 2477. These image strips can alternate by columns, as shown in FIG. 24A, with a vertically-interlaced structure, or by rows. It may even be useful to spatially normalize lens facets while interlacing the left and right eye image strips 2473, 2477, as seen in FIG. 24B, with a vertically-interlaced, spatially-normalized structure, and FIG. 24C, illustrating a horizontally-interlaced, spatially-normalized structure. Interlacing may also be accomplished using smoothed image strips 2473, 2477, as seen in FIG. 24D. If the image capture device 2410 utilizes a different coordinate space, the previously discussed vector based lens formulation techniques can be modified to generate the necessary corresponding lens 2400 structure.

Figure 25A:
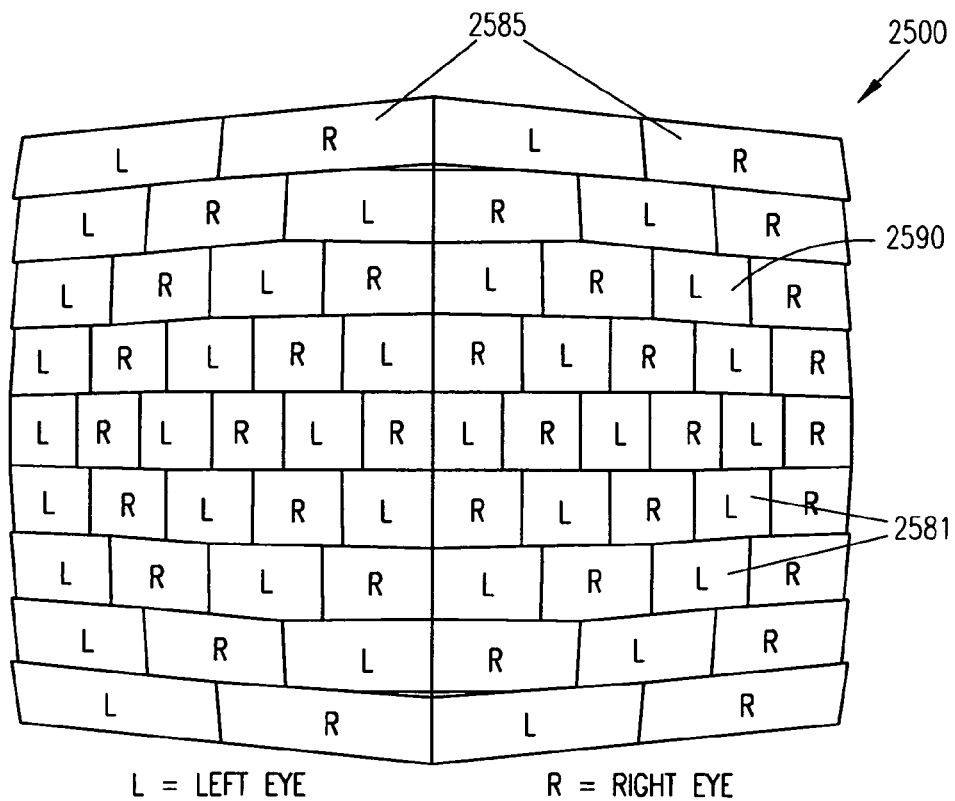
FIGS. 25A and 25B are frontal and perspective views of a lens and image capture/projection apparatus according to various embodiments.
Figure 25B:
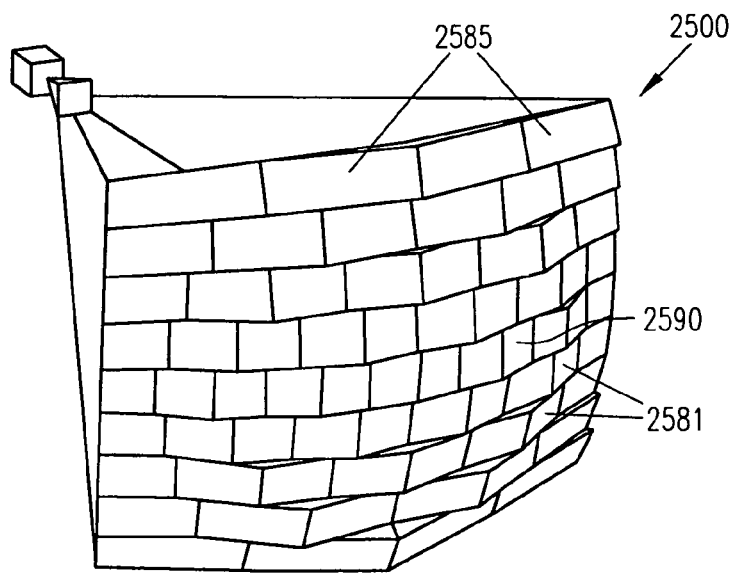

FIGS. 25A and 25B are frontal and perspective views of a lens and image capture/projection apparatus according to various embodiments. In some cases, it may be desirable to intersperse left and right eye lens facets in a more irregular or sporadic manner, for example, when designing lenses in conjunction with an image capture device (or projector) that has a non-rectangular image format. If the desired image format is non-rectangular, it can be difficult to map the lens surface facets directly to rectangular image capture devices. In particular, the density of lens facets may change across the lens surface, as illustrated in FIGS. 25A and 25B, where left eye facets 2581 and right eye facets 2585 are located in an irregular pattern across the exterior surface 2590 of the lens 2500.

Figure 26A:
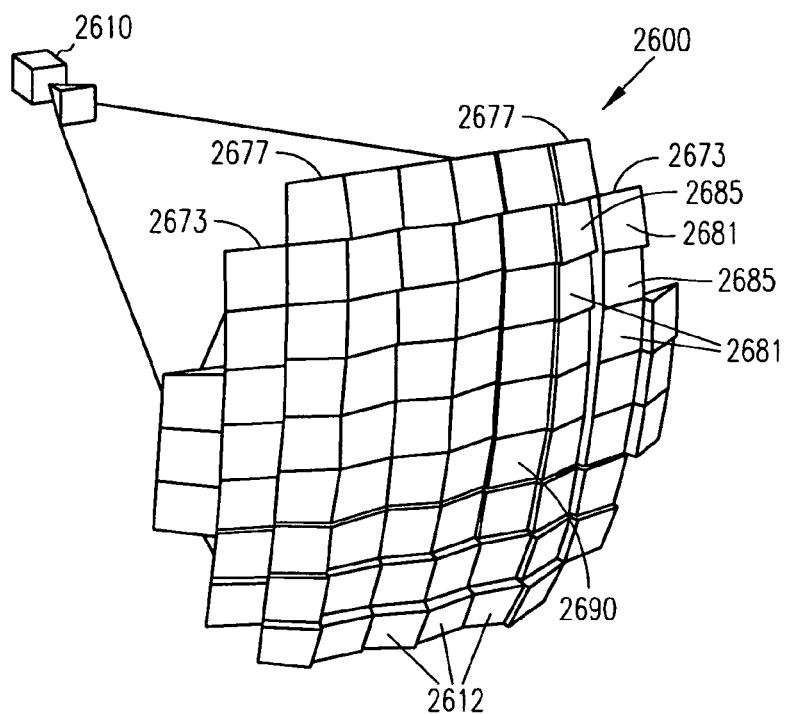
FIGS. 26A and 26B are perspective views of a lens and image capture/projection apparatus according to various embodiments.
Figure 26B:
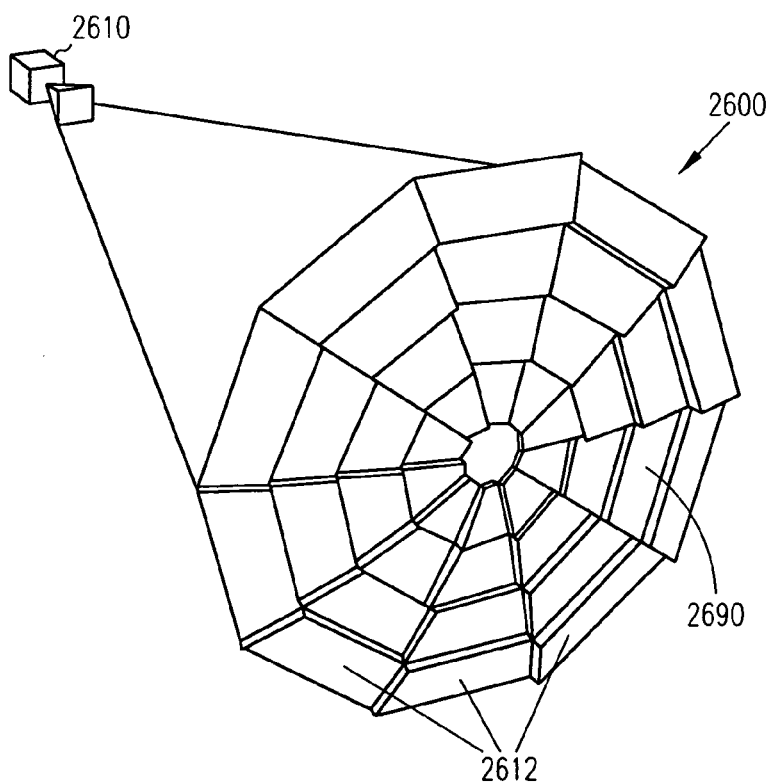

FIGS. 26A and 26B are perspective views of a lens and image capture/projection apparatus according to various embodiments. To locate facets across the surface of a lens for a non-rectangular image format, a process similar to that described previously may be used. That is, known camera rays may be used to determine surface normal vectors for each facet. Thus, the facets 2612 on the exterior surface of the lens 2600 may be arranged as shown in either FIG. 26A or 26B for use with a circular image sensor.

Though many different lens design methods and lens structures have been discussed, it should be noted that such lenses, though physically and aesthetically distinct, can perform stereoscopic refraction. As such, it is not necessary to form the complete cylindrical device entirely out of modules that use the same type of lens. For example, lenses that perform the desired refraction at the internal lens surface, as well as lenses that perform the desired refraction at the external lens surface, can be used as part of different modules in the same cylindrical device.

Thus, many additional embodiments may be realized. For example, a lens 2600 may include a first surface (e.g., exterior surface 2690 or interior surface) having one or more first separating facets 2681 with a first surface normal vector $N_{S1}$ determined by a first surface normal angle $\Theta_{SN1}$ included between the first surface normal vector $N_{S1}$ and a first incident vector $I_{c1}$ to intersect at a first point including a cross product vector comprising a cross product of the first incident vector $I_{c1}$ and a first refracting vector $R_1$. The first surface normal angle $\Theta_{SN1}$ may be approximately equal to arctan $$\left( \frac{\sqrt{1 - (I_{c1} \cdot R_1)^2}}{\frac{n_1}{n_2} - (I_{c1} \cdot R_1)} \right),$$

wherein the vectors $N_{S1}$, $R_1$, and $I_{c1}$ are included in a common plane, wherein the first incident vector $I_{c1}$ comprises a ray incident to the first separating facet 2681 and passing through a first viewpoint (e.g., left eye viewpoint), wherein the first refracting vector $R_1$ comprises a ray to be refracted by the first separating facet 2681, wherein $n_1$ comprises an index of refraction corresponding to the first incident vector $I_{c1}$, wherein $n_2$ comprises an index of refraction corresponding to the first refracting vector $R_1$, and wherein the first surface normal vector $N_{S1}$ may be rotated around the cross product vector by the first surface normal angle $\Theta_{SN1}$ in the common plane.

The first surface may include one or more second separating facets 2685 to refract a second incident ray $I_{c2}$ passing through a second viewpoint (e.g., left eye viewpoint) different from the first viewpoint. The first surface may form a portion of a substantially spherical surface. The second separating facet 2685 may have a second surface normal vector $N_{S2}$ determined by a second surface normal angle $\Theta_{SN2}$ included between the second surface normal vector $N_{S2}$ and a second incident vector $I_{c2}$ to intersect at a second point including a cross product vector comprising a cross product of the second incident vector $I_{c2}$ and a second refracting vector $R_2$, wherein the second surface normal angle $\Theta_{SN2}$ is approximately equal to arctan $$\left( \frac{\sqrt{1 - (I_{c2} \cdot R_2)^2}}{\frac{n_3}{n_4} - (I_{c2} \cdot R_2)} \right),$$

wherein the vectors $N_{S2}$, $R_2$, and $I_{c2}$ are included in the common plane, wherein the second incident vector $I_{c2}$ comprises a ray incident to the second separating facet 2685 and passing through the second viewpoint (which may be different than the first viewpoint), wherein the second refracting vector $R_2$ comprises a ray refracted by the second separating facet, wherein $n_3$ comprises an index of refraction corresponding to the second incident vector $I_{c2}$, wherein $n_4$ comprises an index of refraction corresponding to the second refracting vector $R_2$, and wherein the second surface normal vector $N_{S2}$ is rotated around the cross product vector by the second surface normal angle $\Theta_{SN2}$ in the common plane.

In some embodiments, the first surface may include the second separating facet (e.g., the first and second facets 2681, 2685 are included in the same surface), with $n_1=n_3$ and $n_2=n_4$. In some embodiments, the first surface may include the second separating facet 2685 adjacent the first separating facet 2681. The first separating facet 2681 and the second separating facet 2685 may be spatially normalized. The first surface may comprise a substantially smooth surface. The first surface may form a portion of a substantially spherical surface.

In some embodiments, the first surface 2690 may include the first and second separating facets 2681, 2685. The first surface 2690 may also include a first substantially discrete lens strip 2673 including the first separating facet 2681, perhaps corresponding to a first coordinate space (e.g., a first group of pixels) of an associated imaging device 2610. The first surface 2690 may also include a second substantially discrete lens strip 2677 including the second separating facet 2685, perhaps corresponding to a second coordinate space (e.g., a second group of pixels, possibly different from the first group of pixels, or perhaps including a subset of the first group of pixels) of the associated imaging device 2610. The first substantially discrete lens strip 2673 may correspond to a left eye viewpoint, and the second substantially discrete lens strip 2677 may correspond to a right eye viewpoint.

In some embodiments, the first substantially discrete lens strip 2673 may be interlaced with a plurality of substantially discrete lens strips including the second substantially discrete lens strip 2677. The first substantially discrete lens strip 2673 and the second substantially discrete lens strip 2677 may be spatially normalized. The first surface 2690 may comprises a substantially smooth surface. The first surface 2690 may form a portion of a substantially spherical surface.

In some embodiments, the first surface 2690 may include one or more second separating facets 2685, further including a first substantially discrete lens strip 2673 including the first separating facet 2681 corresponding to a left eye viewpoint, and the second separating facet 2685 corresponding to a right eye viewpoint. The first surface 2690 may also include a second substantially discrete lens strip 2677 including a first plurality of separating facets 2681 corresponding to the left eye viewpoint, and a second plurality of separating facets 2685 corresponding to the right eye viewpoint. The first and second separating facets may be spatially normalized. The first surface, which may be selected from an internal surface or an external surface, may comprise a substantially smooth surface, and/or form a portion of a substantially spherical surface.

In some embodiments, the first surface may include the second separating facet(s) and at least one additional separating facet to refract a third incident ray $I_{c3}$ passing through a third viewpoint different from the first viewpoint and the second viewpoint. It may be desirable that $n_1=n_3$ and $n_2=n_4$. The first separating facet may be located adjacent the second separating facet and the at least one additional separating facet.

In some embodiments, the lens 2600 may include a second surface different from the first surface (e.g., the first surface may comprise an external surface, and the second surface may comprise an internal surface). The first surface may include the first separating facet(s), and the second surface may include the second separating facet(s). In some cases, it may be useful to implement a lens design where $n_1 \neq n_3$ and $n_2 \neq n_4$, and the vector $I_{c1}$ includes the vector $R_2$.

A multi-faceted lens may be used in a number of applications. for example, as part of a spherical stereoscopic video capture or projection apparatus and system. Thus, the previously discussed faceted lens approach works just as well for spherical stereoscopic video capture as it does for cylindrical stereoscopic video capture. The three-dimensional, vector-based, lens surface formulation techniques provide lens surface refraction calculations based on any set of three-dimensional incident (image capture device) vectors and any desired set of three-dimensional refracted (left or right eye) vectors. As such, a plurality of image capture devices and associated refracting lenses can be used to create a unified spherical stereoscopic video capture apparatus and system.

Figure 27A:
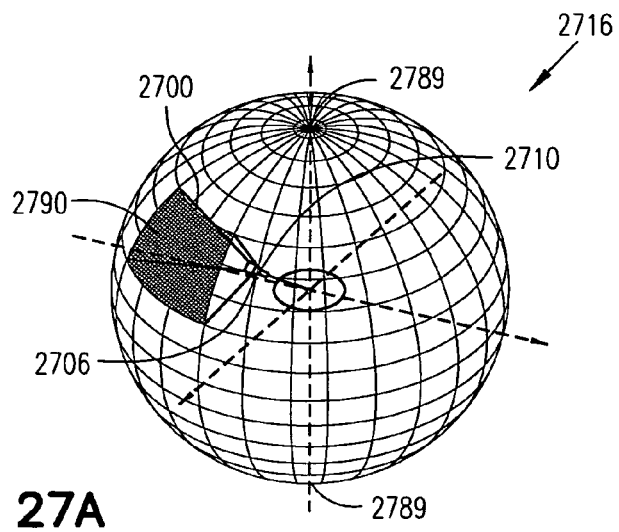
FIGS. 27A-27C are perspective views of spherical image capture/projection apparatus according to various embodiments.
Figure 27B:
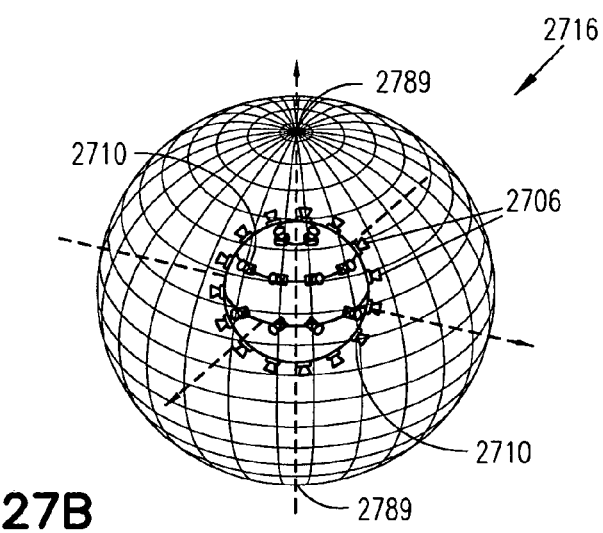
Figure 27C:
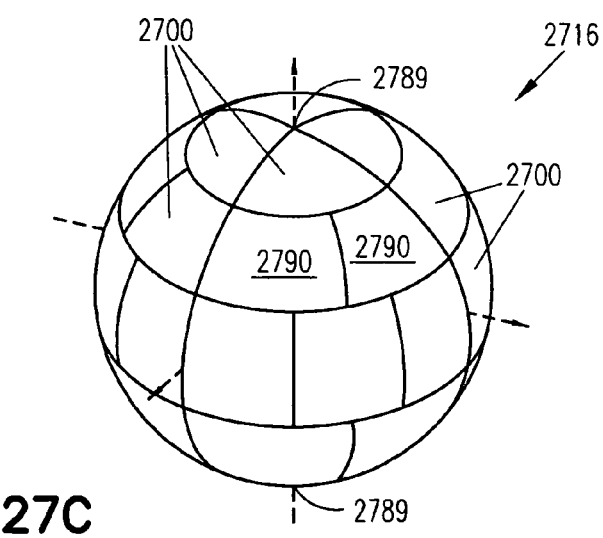

FIGS. 27A-27C are perspective views of spherical image capture/projection apparatus according to various embodiments. Cylindrical configurations may include a set of image capture devices arranged around the perimeter of a circle, with associated lenses that together formed a substantially cylindrical surface. Spherical device configurations can make use of image capture devices arranged around the perimeter of a sphere, with associated lenses that together form a substantially spherical surface.

For example, FIG. 27A depicts one such image capture device 2710 with arbitrary orientation, as well as its associated spherical surface 2790 of a lens 2700. One possible configuration including a plurality of image capture devices 2710 is illustrated in FIG. 27B, while FIG. 27C illustrates a corresponding set of spherical lens surface 2790 regions. In some cases, the spherical format may be more difficult to match to conventional rectangular image capture devices, such that some image capture devices 2710 may only make use of a subset of their available image area, especially proximate to the apexes 2789 of the sphere.

Figure 28A:
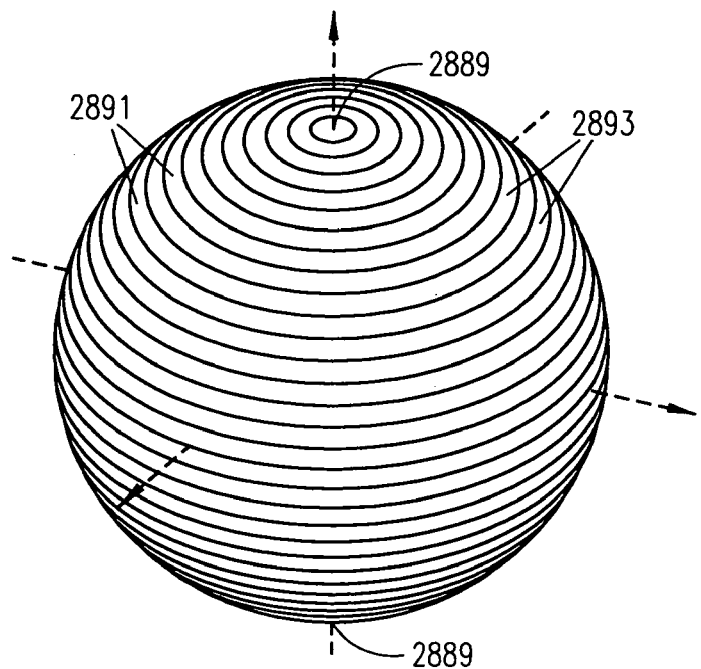
FIGS. 28A-28D are perspective views of lenses having interlaced strips corresponding to right and left eye viewpoints according to various embodiments.
Figure 28B:
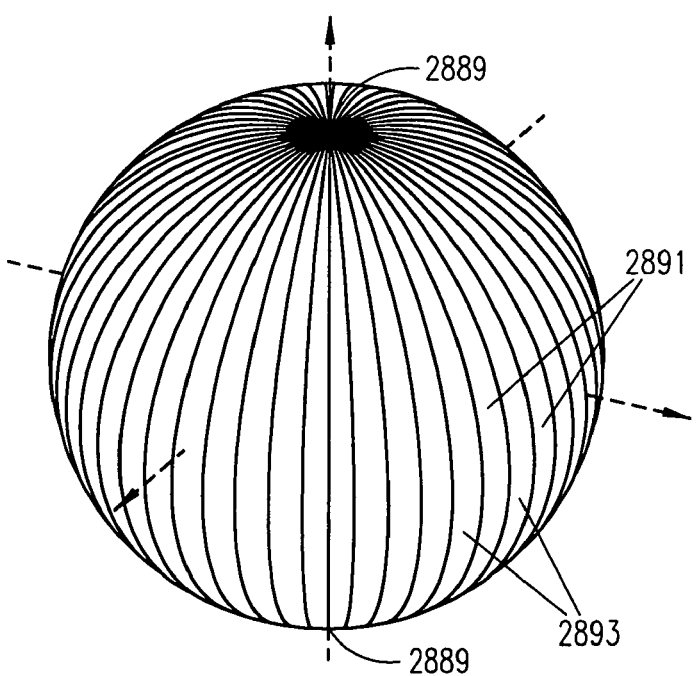
Figure 28C:
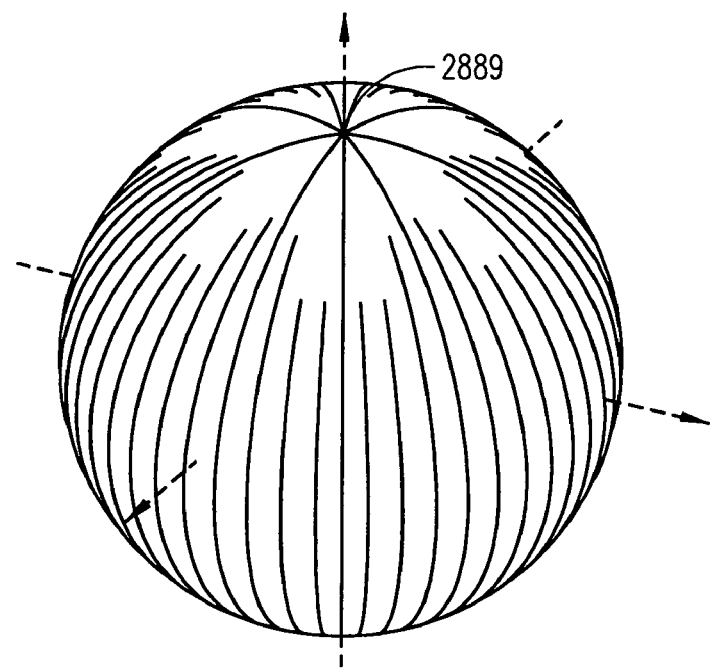
Figure 28D:
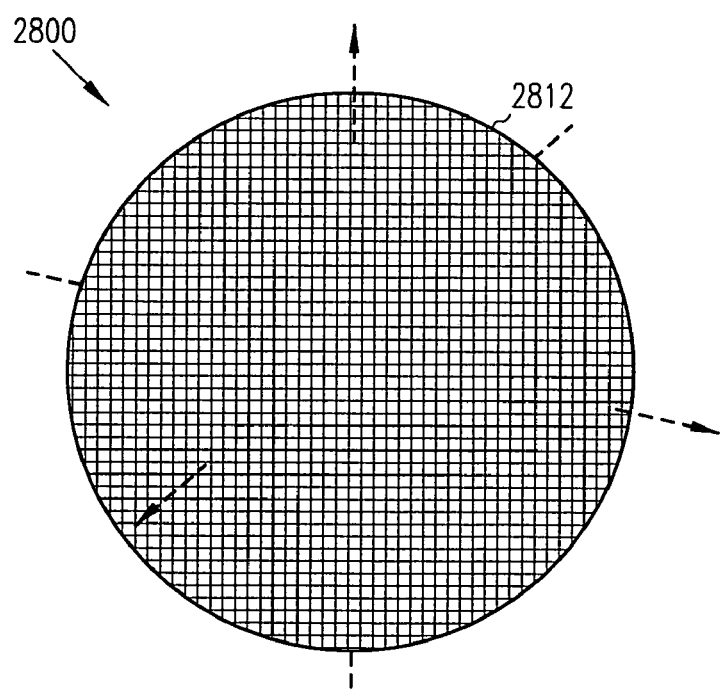

FIGS. 28A-28D are perspective views of lenses having interlaced strips corresponding to right and left eye viewpoints according to various embodiments. Thus it can be seen that the lenses described, as designed for left and right eye viewpoints, can be merged to form stereoscopic lenses. A spherical format may benefit from modification of the previously discussed merge techniques. For example, when interlacing left and right eye lens sections to from a portion of a spherical capture device, the spherical surface topology may be utilized to provide the desired result. Small latitudinal slices of the left eye surfaces 2991 can be alternated with small latitudinal slices of the right eye surfaces 2993, as illustrated in FIG. 28A. Conversely, small longitudinal slices of the left eye surfaces 2991 can be alternated with small longitudinal slices of the right eye surfaces 2993, as illustrated in FIG. 28B. However, using longitudinal surface slices may provide slices that become increasingly dense at the sphere's apexes 2889. Maintaining a substantially uniform slice width across the spherical surface can compensate for this effect, perhaps effectively reducing the number of slices as the apex 2889 is approached, as illustrated in FIG. 28C. In FIG. 28D, it can be seen that the pixelated or multi-faceted lens surface technique can be applied to some or all of a spherical lens surface 2800, even to the point of assigning a single lens facet 2812 per sensor element.

Thus, by combining earlier-described apparatus and systems with the variety of lenses and configurations shown, other embodiments may be realized. For example, referring to FIGS. 5 and 27, it can be seen that an apparatus 516, 2716 may comprise a first lens 2700 having a first plurality of interleaved separating facets including a first separating facet to refract left eye rays and a second separating facet to refract right eye rays, and a first image acquisition plane 2706 to receive a first refracted left eye ray from the first separating facet, and to receive a first refracted right eye ray from the second separating facet. The facets may be oriented as described above. The apparatus 2716 may include a second lens 2700 having a second plurality of interleaved separating facets including a third separating facet to refract the left eye rays and a fourth separating facet to refract the right eye rays, as well as a second image acquisition plane to receive a second refracted left eye ray from the third separating facet, and to receive a second refracted right eye ray from the fourth separating facet. In fact, such an apparatus 2716 may have any number of image acquisition planes and lenses with interleaved, separating facets in accordance with the teachings set forth herein. Discrete lens strips, including one or more separating facets, may correspond to one or more coordinate spaces (e.g., pixel groupings) of individual image acquisition planes. The lens strips may correspond to left and/or right eye viewpoints, and thus, the separating facets may be associated with some selected inter-ocular distance.

Still further embodiments may be realized. For example, referring to FIGS. 5, 6, and 27, it can be seen that a system 536, 636, and 2736 may include a plurality of lenses 2700 having a plurality of interleaved separating facets including a first separating facet to refract left eye rays and a second separating facet to refract right eye rays, with the orientation of the facets determined as described above. The system 2736 may also include a plurality of image acquisition planes 2706 to receive refracted left eye rays from the first separating facets and to receive refracted right eye rays from the second separating facets, as well as a memory 556 to receive image data from the plurality of image acquisition planes 2706. The image data may include separated left eye images and/or separated right eye images, as well as information to construct a stereoscopic image, or a panoramic stereoscopic image. In some embodiments, a processor 560 may be coupled to the memory 556 to join separated left and right eye images.

The faceted lens 100, 200, 300, 400, 500, 538, 542, 600, 700, 800, 900, 1000, 1100, 1200, 1300, 1400, 1500, 1800, 1900, 2000, 2100, 2200, 2300, 2400, 2500, 2600, 2700, 2800; refracting right eye rays 102, 202; outer surface 104, 204, 304; image acquisition planes 106, 206, 306, 406, 540, 544, 1406, 1806, 2706; video camera 110, 210, 310; lens facets 112, 212, 312, 412, 512, 1412, 1512, 1812, 2112, 2212, 2612, 2812; eye rays 114, 214; apparatus 316, 416, 516, 716, 1416, 1516, 2716; first separating facet 422, 1422, 1522, 2581, 2681; left eye rays 424, 1424, 1524; second separating facet 426, 1426, 1526, 2585, 2685; right eye rays 428, 1428, 1528; image capture device 430, 530, 730, 830, 930, 1430, 2110, 2410, 2610, 2710; refracted left eye ray 432, 1432, 1532; refracted right eye ray 434, 1434, 1534; systems 536, 636, 2736; inner radii 546, 552; portion 548; cylindrical section 550; cylinder 554; memory 556; image data 558; processor 560; objects 762; interlaced image 764; left and right eye image strips 766, 768; left and right image sections 770, 772; left and right eye panoramic images 774, 776; lens surface 974, 1074, 1374; rays 976, 978, 1080, 1082, 1380, 1382, 1386; circular paths of eye rotation 1084, 1384, 1388; additional eye ray 1386; image projection plane 1506, 1806; image projection device 1530, exterior surfaces 1890, 1990, 2090, 2190, 2290, 2390, 2590, 2690, 2790; interior surfaces 1892, 1992, 2092, 2192; image projector 2194, 2494; spherical apexes 2789, 2889; and strips 2473, 2477, 2673, 2677,

2891, 2893 may all be characterized as "modules" herein. Such modules may include hardware circuitry, and/or one or more processors and/or memory circuits, software program modules, including objects and collections of objects, and/or firmware, and combinations thereof, as desired by the architect of the lens 100, 200, 300, 400, 500, 538, 542, 600, 700, 800, 900, 1000, 1100, 1200, 1300, 1400, 1500, 1800, 1900, 2000, 2100, 2200, 2300, 2400, 2500, 2600, 2700, 2800, 2900 apparatus 316, 416, 516, 716, 1416, 1516, 2716 and systems 536, 636, 2736 and as appropriate for particular implementations of various embodiments.

It should also be understood that the lens, apparatus, and systems of various embodiments can be used in applications other than panoramic cameras, and thus, various embodiments are not to be so limited. The illustrations of the lens 100, 200, 300, 400, 500, 538, 542, 600, 700, 800, 900, 1000, 1100, 1200, 1300, 1400, 1500, 1800, 1900, 2000, 2100, 2200, 2300, 2400, 2500, 2600, 2700, 2800, 2900, apparatus 316, 416, 516, 716, 1416, 1516, 2716 and systems 536, 636, 2736 are intended to provide a general understanding of the structure of various embodiments, and they are not intended to serve as a complete description of all the elements and features of apparatus and systems that might make use of the structures described herein.

Applications that may include the novel lens, apparatus, and systems of various embodiments include frame grabbers, cameras, binoculars, telescopes, and microscopes. Such lenses, apparatus, and systems may further be included as sub-components within a variety of electronic systems, such as televisions, cellular telephones, personal computers, personal digital assistants (PDAs), workstations, video players, video games, vehicles, and others.

Implementing the lenses, apparatus, systems, and methods described herein may provide a mechanism for re-creating panoramic (up to 360 degrees), stereoscopic images in real time, via image capture and/or projection. In many cases, a single lens may be used in place of multiple lenses. Such a mechanism may improve the quality of imaging in three dimensions at reduced cost and increased efficiency.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:

refracting a plurality of left eye rays through one of a first plurality of separating facets of a lens and receiving the refracted left eye rays at an image acquisition plane of an image capture device; and refracting a plurality of right eye rays through one of a second plurality of separating facets of the lens and receiving the refracted right eye rays at the image acquisition plane of an image capture device, wherein at least one facet of the first plurality of separating facets has a surface normal vector $N_{S1}$ determined by a surface normal angle $\Theta_{SN1}$ included between the surface normal vector $N_{S1}$ and an incident vector $I_{c1}$ to intersect at a point including a cross product vector comprising a cross product of the incident vector $I_{c1}$ and a refracting vector $R_1$, wherein the surface normal angle $\Theta_{SN1}$ is approximately equal to arctan $$\left( \frac{\sqrt{1-(I_{c1} \cdot R_1)^2}}{\frac{n_1}{n_2} - (I_{c1} \cdot R_1)} \right),$$

wherein the vectors $N_{S1}$, $R_1$, and $I_{c1}$ are included in a common plane, wherein the incident vector $I_{c1}$ comprises a ray incident to the at least one facet and passing through a first viewpoint, wherein the refracting vector $R_1$ comprises a ray to be refracted by the at least one facet, wherein $n_1$ comprises an index of refraction corresponding to the incident vector $I_{c1}$, wherein $n_2$ comprises an index of refraction corresponding to the refracting vector $R_1$, and wherein the surface normal vector $N_{s1}$ is rotated around the cross product vector by the surface normal angle $\Theta_{SN1}$ in the common plane.

2. The method of claim 1, further comprising:

acquiring data from the image acquisition plane to construct a separated eye image.

3. The method of claim 2, wherein the separated eye image is selected from one of a separated left eye image and a separated right eye image.

4. The method of claim 3, further comprising:

joining the separated eye image to provide a joined eye image.

5. The method of claim 4, wherein the joined eye image is selected from one of a joined right eye image and a joined left eye image.

6. The method of claim 5, further comprising:

combining the joined left eye image and the joined right eye image to provide a stereoscopic image.

7. The method of claim 5, further comprising:
combining the joined left eye image and the joined right eye image to provide a panoramic stereoscopic image.

8. The method of claim 5, further comprising:
combining the joined left eye image and the joined right eye image to provide a substantially spherical stereoscopic image.

9. The method of claim 1, further comprising:
repeatedly acquiring data from the image acquisition plane to construct a plurality of separated left eye images;
repeatedly acquiring data from the image acquisition plane to construct a plurality of separated right eye images; and
processing the plurality of separated left eye images and the plurality of separated right eye images to provide a moving stereoscopic image.

10. The method of claim 1, further comprising:
repeatedly acquiring data from the image acquisition plane to construct a plurality of separated left eye images;
repeatedly acquiring data from the image acquisition plane to construct a plurality of separated right eye images; and
processing the plurality of separated left eye images and the plurality of separated right eye images to provide a moving panoramic stereoscopic image.

11. The method of claim 1, further comprising:
repeatedly acquiring data from the image acquisition plane to construct a plurality of separated left eye images;
repeatedly acquiring data from the image acquisition plane to construct a plurality of separated right eye images; and
processing the plurality of separated left eye images and the plurality of separated right eye images to provide a moving substantially spherical stereoscopic image.

12. A method, comprising:
accessing a plurality of separated left eye images;
accessing a plurality of separated right eye images;
processing the plurality of separated left eye images and the plurality of separated right eye images to project a first portion of a moving stereoscopic image through a lens having at least one facet including a surface normal vector $N_{S1}$ determined by a surface normal angle $\Theta_{SN1}$ included between the surface normal vector $N_{S1}$ and an incident vector $I_{c1}$ to intersect at a point including a cross product vector comprising a cross product of the incident vector $I_{c1}$ and a refracting vector $R_1$, wherein the surface normal angle $\Theta_{SN1}$ is approximately equal to arctan $$\left( \frac{\sqrt{1-(I_{c1} \cdot R_1)^2}}{\frac{n_1}{n_2} - (I_{c1} \cdot R_1)} \right),$$

wherein the vectors $N_{S1}$, $R_1$, and $I_{c1}$ are included in a common plane,
wherein the incident vector $I_{c1}$ comprises a ray incident to the at least one facet and passing through a viewpoint, wherein the refracting vector $R_1$ comprises a ray to be refracted by the at least one facet, wherein $n_1$ comprises an index of refraction corresponding to the incident vector $I_{c1}$, wherein $n_2$ comprises an index of refraction corresponding to the refracting vector $R_1$, and wherein the surface normal vector $N_{S1}$ is rotated around the cross product vector by the surface normal angle $\Theta_{SN1}$ in the common plane.

13. The method of claim 12, wherein the moving stereoscopic image comprises a panoramic stereoscopic moving image.

14. The method of claim 12, wherein the moving stereoscopic image comprises a substantially spherical stereoscopic moving image.

15. The method of claim 12, further comprising:
processing the plurality of separated left eye images and the plurality of separated right eye images to project a second portion of a moving stereoscopic image through the lens having another facet with a surface normal vector $N_{S2}$ determined by a surface normal angle $\Theta_{SN2}$ included between the surface normal vector $N_{S2}$ and an incident vector $I_{c2}$ to intersect at a point including a cross product vector comprising a cross product of the incident vector $I_{c2}$ and a refracting vector $R_2$, wherein the surface normal angle $\Theta_{SN2}$ is approximately equal to arctan $$\left( \frac{\sqrt{1-(I_{c2} \cdot R_2)^2}}{\frac{n_3}{n_4} - (I_{c2} \cdot R_2)} \right),$$

wherein the vectors $N_{S2}$, $R_2$, and $I_{c2}$ are included in the common plane,
wherein the incident vector $I_{c2}$ comprises a ray incident to the other facet and passing through a second viewpoint different than the first viewpoint, wherein the refracting vector $R_2$ comprises a ray refracted by the other facet, wherein $n_3$ comprises an index of refraction corresponding to the incident vector $I_{c2}$, wherein $n_4$ comprises an index of refraction corresponding to the refracting vector $R_2$, and wherein the surface normal vector $N_{S2}$ is rotated around the cross product vector by the surface normal angle $\Theta_{SN2}$ in the common plane.

16. An article comprising a non-transitory computer readable medium having associated information, wherein the information, when accessed, results in a machine performing:
receiving a plurality of left eye rays through one of a first plurality of separating facets of a lens at an image acquisition plane; and
receiving a plurality of right eye rays through one of a second plurality of separating facets of the lens at the image acquisition plane, wherein at least one facet of the first plurality of separating facets has a surface normal vector $N_{S1}$ determined by a surface normal angle $\Theta_{SN1}$ included between the surface normal vector $N_{S1}$ and an incident vector $I_{c1}$ to intersect at a point including a cross product vector comprising a cross product of the incident vector $I_{c1}$ and a refracting vector $R_1$, wherein the surface normal angle $\Theta_{SN1}$ is approximately equal to arctan $$\left( \frac{\sqrt{1-(I_{c1} \cdot R_1)^2}}{\frac{n_1}{n_2} - (I_{c1} \cdot R_1)} \right),$$

wherein the vectors $N_{S1}$, $R_1$, and $I_{c1}$ are included in a common plane,
wherein the incident vector $I_{c1}$ comprises a ray incident to the at least one facet and passing through a first viewpoint, wherein the refracting vector $R_1$ comprises a ray to be refracted by the at least one facet, wherein $n_1$ comprises an index of refraction corresponding to the incident vector $I_{c1}$, wherein $n_2$ comprises an index of refraction corresponding to the refracting vector $R_1$, and wherein the surface normal vector $N_{S1}$ is rotated around the cross product vector by the surface normal angle $\Theta_{SN1}$ in the common plane.

17. The article of claim 16, wherein the information, when accessed, results in the machine performing:
   acquiring data from the image acquisition plane to construct a separated eye image.

18. The article of claim 17, wherein the separated eye image is selected from one of a separated left eye image and a separated right eye image.

19. The article of claim 18, wherein the information, when accessed, results in the machine performing:
   joining the separated left eye image to provide a joined left eye image; and
   joining the separated right eye image to provide a joined right eye image.

20. The article of claim 19, wherein the information, when accessed, results in the machine performing:
   combining the joined left eye image and the joined right eye image to provide a stereoscopic image.

21. A lens, including:
   a first surface having a first separating facet with a first surface normal vector $N_{S1}$ determined by a first surface normal angle $\Theta_{SN1}$ included between the first surface normal vector $N_{S1}$ and a first incident vector $I_{c1}$ to intersect at a first point including a cross product vector comprising a cross product of the first incident vector $I_{c1}$ and a first refracting vector $R_1$, wherein the first surface normal angle $\Theta_{SN1}$ is approximately equal to arctan $$\left( \frac{\sqrt{1-(I_{c1} \cdot R_1)^2}}{\frac{n_1}{n_2} - (I_{c1} \cdot R_1)} \right),$$

wherein the vectors $N_{S1}$, $R_1$, and $I_{c1}$ are included in a common plane, wherein the first incident vector $I_{c1}$ comprises a ray incident to the first separating facet and passing through a first viewpoint, wherein the first refracting vector $R_1$ comprises a ray to be refracted by the first separating facet, wherein $n_1$ comprises an index of refraction corresponding to the first incident vector $I_{c1}$, wherein $n_2$ comprises an index of refraction corresponding to the first refracting vector $R_1$, and wherein the first surface normal vector $N_{S1}$ is rotated around the cross product vector by the first surface normal angle $\Theta_{SN1}$ in the common plane.

22. The lens of claim 21, wherein the first surface includes a second separating facet to refract a second incident ray $I_{c2}$ passing through a second viewpoint different from the first viewpoint.

23. The lens of claim 21, wherein the first surface forms a portion of a substantially spherical surface.

24. The lens of claim 21, further including:
   a second separating facet with a second surface normal vector $N_{S2}$ determined by a second surface normal angle $\Theta_{SN2}$ included between the second surface normal vector $N_{S2}$ and a second incident vector $I_{c2}$ to intersect at a second point including a cross product vector comprising a cross product of the second incident vector $I_{c2}$ and a second refracting vector $R_2$, wherein the second surface normal angle $\Theta_{SN2}$ is approximately equal to arctan $$\left( \frac{\sqrt{1-(I_{c2} \cdot R_2)^2}}{\frac{n_3}{n_4} - (I_{c2} \cdot R_2)} \right),$$

wherein the vectors $N_{S2}$, $R_2$, and $I_{c2}$ are included in the common plane,
wherein the second incident vector $I_{c2}$ comprises a ray incident to the second separating facet and passing through a second viewpoint different than the first viewpoint, wherein the second refracting vector $R_2$ comprises a ray refracted by the second separating facet, wherein $n_3$ comprises an index of refraction corresponding to the second incident vector $I_{c2}$, wherein $n_4$ comprises an index of refraction corresponding to the second refracting vector $R_2$, and wherein the second surface normal vector $N_{S2}$ is rotated around the cross product vector by the second surface normal angle $\Theta_{SN2}$ in the common plane.

25. The lens of claim 24, wherein the first surface includes the second separating facet, and wherein $n_1=n_3$ and $n_2=n_4$.

26. The lens of claim 24, wherein the first surface includes the second separating facet adjacent the first separating facet.

27. The lens of claim 26, wherein the first separating facet and the second separating facet are spatially normalized.

28. The lens of claim 26, wherein the first surface comprises a substantially smooth surface.

29. The lens of claim 26, wherein the first surface forms a portion of a substantially spherical surface.

30. The lens of claim 24, wherein the first surface includes the second separating facet, further including:
   a first substantially discrete lens strip including the first separating facet and corresponding to a first coordinate space of an associated imaging device; and
   a second substantially discrete lens strip including the second separating facet and corresponding to a second coordinate space of the associated imaging device.

31. The lens of claim 30, wherein the first substantially discrete lens strip corresponds to a left eye viewpoint, and wherein the second substantially discrete lens strip corresponds to a right eye viewpoint.

32. The lens of claim 30, wherein the first substantially discrete lens strip is interlaced with a plurality of substantially discrete lens strips including the second substantially discrete lens strip.

33. The lens of claim 29, wherein the first substantially discrete lens strip and the second substantially discrete lens strip are spatially normalized.

34. The lens of claim 29, wherein the first surface comprises a substantially smooth surface.

35. The lens of claim 29, wherein the first surface forms a portion of a substantially spherical surface.

36. The lens of claim 24, wherein the first surface includes the second separating facet, further including:
   a first substantially discrete lens strip including the first separating facet corresponding to a left eye viewpoint, and the second separating facet corresponding to a right eye viewpoint; and
   a second substantially discrete lens strip including a first plurality of separating facets corresponding to the left eye viewpoint, and a second plurality of separating facets corresponding to the right eye viewpoint.

37. The lens of claim 36, wherein the first separating facet and the second separating facet are spatially normalized.

38. The lens of claim 36, wherein the first surface comprises a substantially smooth surface.

39. The lens of claim 36, wherein the first surface forms a portion of a substantially spherical surface.

40. The lens of claim 24, wherein the first surface comprises a surface selected from one of an external surface and an internal surface.

41. The lens of claim 40, wherein the first surface includes the second separating facet and at least one additional separating facet to refract a third incident ray $I_{c3}$ passing through a third viewpoint different from the first viewpoint and the second viewpoint, and wherein $n_1=n_3$ and $n_2=n_4$.

42. The lens of claim 41, wherein the first separating facet is adjacent the second separating facet and the at least one additional separating facet.

43. The lens of claim 42, wherein the first surface forms a portion of a substantially spherical surface.

44. The lens of claim 24, further including:
a second surface different from the first surface, wherein the second separating facet is included in the second surface, wherein $n_1 \neq n_3$ and $n_2 \neq n_4$, and wherein the vector $I_{c1}$ includes the vector $R_2$.

45. An apparatus, comprising:
a first lens having a first plurality of interleaved separating facets including a first separating facet to refract left eye rays and a second separating facet to refract right eye rays; and
a first image acquisition plane to receive a first refracted left eye ray from the first separating facet, and to receive a first refracted right eye ray from the second separating facet, wherein the first separating facet has a surface normal vector $N_{S1}$ determined by a surface normal angle $\Theta_{SN1}$ included between the surface normal vector $N_{S1}$ and an incident vector $I_{c1}$ to intersect at a point including a cross product vector comprising a cross product of the incident vector $I_{c1}$ and a refracting vector $R_1$, wherein the surface normal angle $\Theta_{SN1}$ is approximately equal to arctan $$\left( \frac{\sqrt{1-(I_{c1} \cdot R_1)^2}}{\frac{n_1}{n_2} - (I_{c1} \cdot R_1)} \right),$$

wherein the vectors $N_{S1}$, $R_1$, and $I_{c1}$ are included in a common plane,
wherein the incident vector $I_{c1}$ comprises a ray incident to the first separating facet and passing through a first viewpoint, wherein the refracting vector $R_1$ comprises a ray to be refracted by the first separating facet, wherein $n_1$ comprises an index of refraction corresponding to the incident vector $I_{c1}$, wherein $n_2$ comprises an index of refraction corresponding to the refracting vector $R_1$, and wherein the surface normal vector $N_{S1}$ is rotated around the cross product vector by the surface normal angle $\Theta_{SN1}$ in the common plane.

46. The apparatus of claim 45, wherein the second separating facet has a surface normal vector $N_{S2}$ determined by a surface normal angle $\Theta_{SN2}$ included between the surface normal vector $N_{S2}$ and an incident vector $I_{c2}$ to intersect at a point including a cross product vector comprising a cross product of the incident vector $I_{c2}$ and a refracting vector $R_2$, wherein the surface normal angle $\Theta_{SN2}$ is approximately equal to arctan $$\left( \frac{\sqrt{1-(I_{c2} \cdot R_2)^2}}{\frac{n_3}{n_4} - (I_{c2} \cdot R_2)} \right),$$

wherein the vectors $N_{S2}$, $R_2$, and $I_{c2}$ are included in the common plane, wherein the incident vector $I_{c2}$ comprises a ray incident to the other facet and passing through a second viewpoint different than the first viewpoint, wherein the refracting vector $R_2$ comprises a ray refracted by the other facet, wherein $n_3$ comprises an index of refraction corresponding to the incident vector $I_{c2}$, wherein $n_4$ comprises an index of refraction corresponding to the refracting vector $R_2$, and wherein the surface normal vector $N_{S2}$ is rotated around the cross product vector by the surface normal angle $\Theta_{SN2}$ in the common plane.

47. The apparatus of claim 45, further comprising:
a second lens having a second plurality of interleaved separating facets including a third separating facet to refract the left eye rays and a fourth separating facet to refract the right eye rays; and
a second image acquisition plane to receive a second refracted left eye ray from the third separating facet, and to receive a second refracted right eye ray from the fourth separating facet.

48. The apparatus of claim 45, wherein the first lens includes:
a first substantially discrete lens strip including the first separating facet and corresponding to a first coordinate space of the first image acquisition plane; and
a second substantially discrete lens strip including the second separating facet and corresponding to a second coordinate space of the first image acquisition plane.

49. The apparatus of claim 45, wherein the first lens includes:
a first substantially discrete lens strip including the first separating facet corresponding to a left eye viewpoint, and the second separating facet corresponding to a right eye viewpoint; and
a second substantially discrete lens strip including a first plurality of separating facets corresponding to the left eye viewpoint, and a second plurality of separating facets corresponding to the right eye viewpoint.

50. The apparatus of claim 45, wherein the first facet and the second facet are associated with a selected inter-ocular distance.

51. A system, comprising:
a plurality of lenses having a plurality of interleaved separating facets including a first separating facet to refract left eye rays and a second separating facet to refract right eye rays, wherein the first separating facet of at least one of the plurality of lenses has a surface normal vector $N_{S1}$ determined by a surface normal angle $\Theta_{SN1}$ included between the surface normal vector $N_{S1}$ and an incident vector $I_{c1}$ to intersect at a point including a cross product vector comprising a cross product of the incident vector $I_{c1}$ and a refracting vector $R_1$, wherein the surface normal angle $\Theta_{SN1}$ is approximately equal to arctan $$\left( \frac{\sqrt{1-(I_{c1} \cdot R_1)^2}}{\frac{n_1}{n_2} - (I_{c1} \cdot R_1)} \right),$$

wherein the vectors $N_{S1}$, $R_1$, and $I_{c1}$ are included in a common plane, wherein the incident vector $I_{c1}$ comprises a ray incident to the first separating facet and passing through a first viewpoint, wherein the refracting vector $R_1$ comprises a ray to be refracted by the first separating facet, wherein $n_1$ comprises an index of refraction corresponding to the incident vector $I_{c1}$, wherein $n_2$ comprises an index of refraction corresponding to the refracting vector $R_1$, and wherein the surface normal vector $N_{S1}$ is rotated around the cross product vector by the surface normal angle $\Theta_{SN1}$ in the common plane;

a plurality of image acquisition planes to receive refracted left eye rays from the first separating facets and to receive refracted right eye rays from the second separating facets; and a memory to receive image data from the plurality of image acquisition planes.

52. The system of claim 51, wherein the image data includes information to construct a stereoscopic image.

53. The system of claim 51, wherein the image data includes information to construct a panoramic stereoscopic image.

54. The system of claim 51, wherein the image data includes a separated left eye image and a separated right eye image.

55. The system of claim 54, further comprising:

a processor coupled to the memory to join the separated left eye image and to join the separated right eye image.

\* \* \* \* \*